Figure 1:
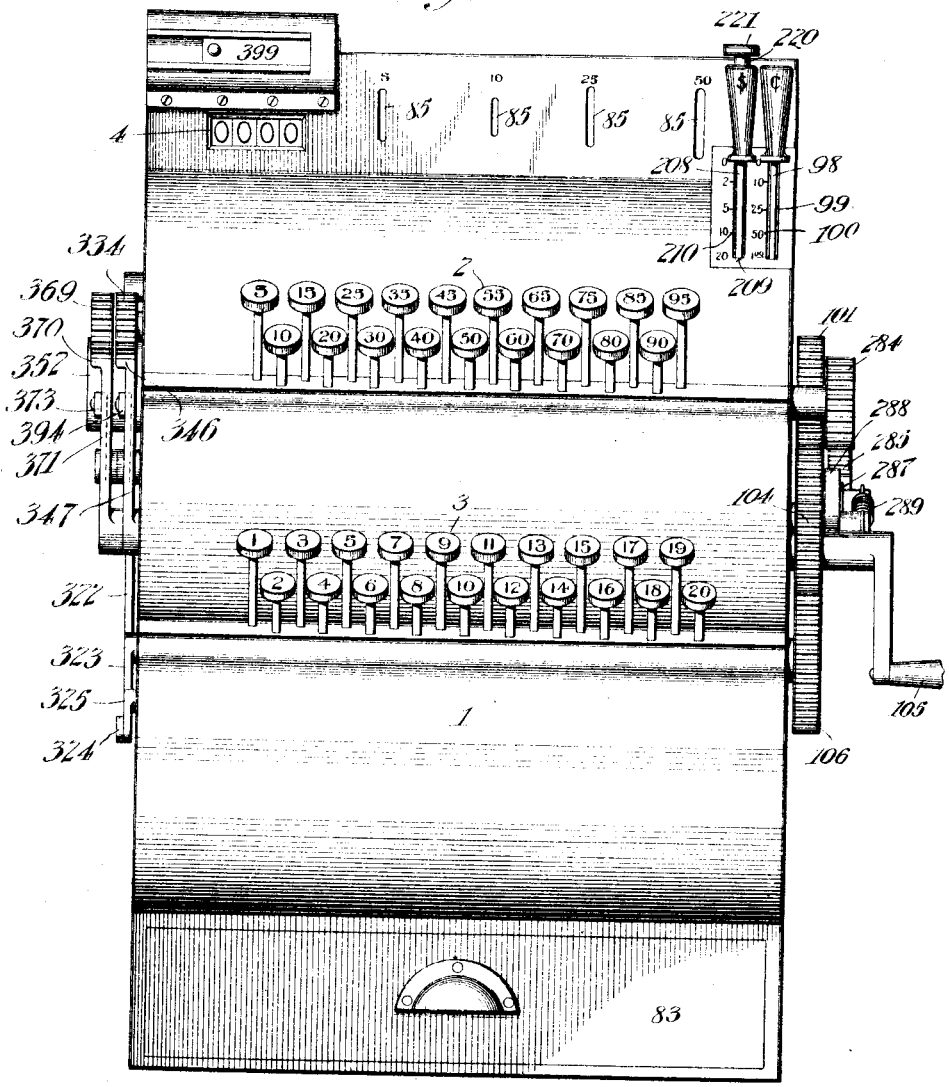

C. D. RICHARD.
CHANGE MAKING CASH REGISTER.
APPLICATION FILED NOV. 1, 1912.

1,175,297.

Patented Mar. 14, 1916.
21 SHEETS—SHEET 5.

Witnesses
T. L. Mockabee
Emory L. Groff

Inventor
Charles Donat Richard.

By D. P. Wolhaupter
his Attorney

C. D. RICHARD.
CHANGE MAKING CASH REGISTER.
APPLICATION FILED NOV. 1, 1912.
1,175,297.
Patented Mar. 14, 1916.
21 SHEETS—SHEET 7.
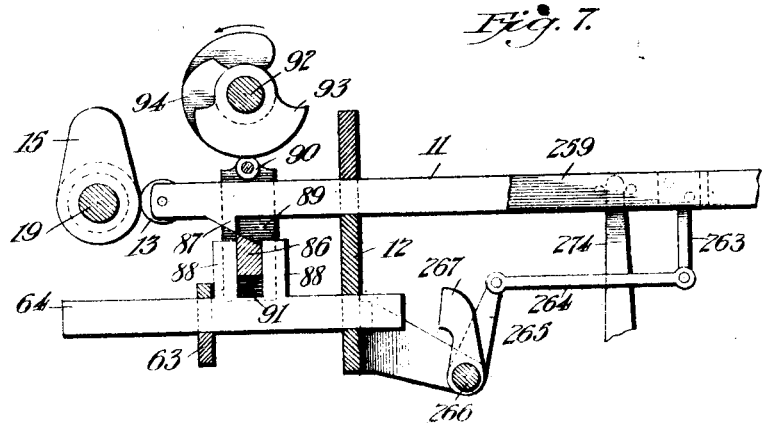
Fig. 7.
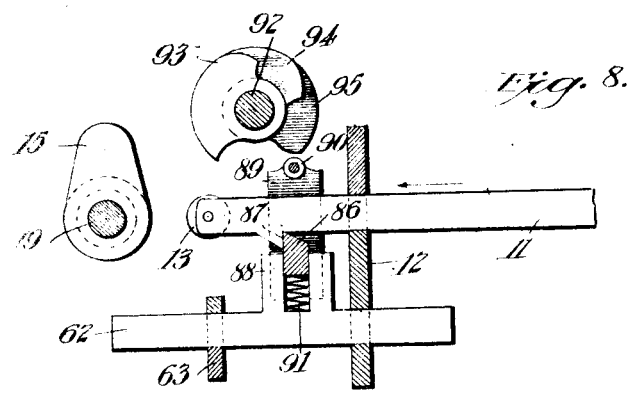
Fig. 8.
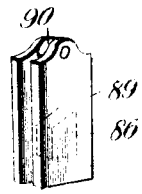
Fig. 9.
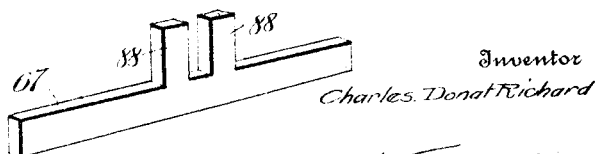
Inventor
Charles Donat Richard
Witnesses

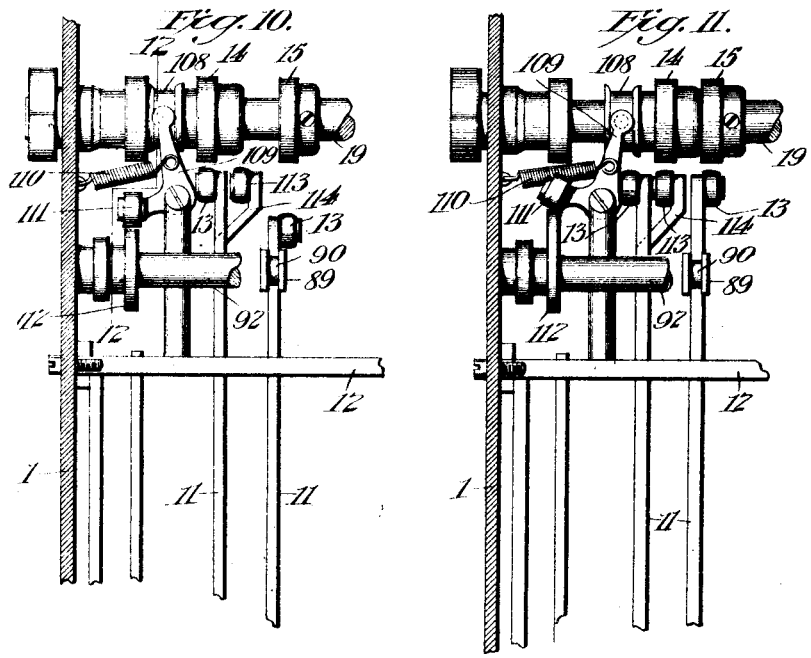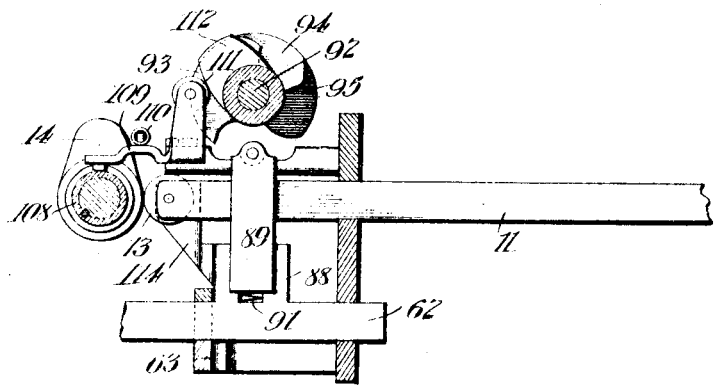

C. D. RICHARD.
CHANGE MAKING CASH REGISTER.
APPLICATION FILED NOV. 1, 1912.
1,175,297.
Patented Mar. 14, 1916.
21 SHEETS—SHEET 9.
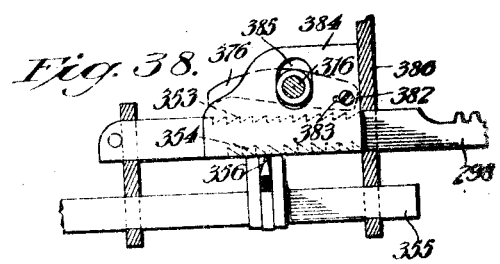
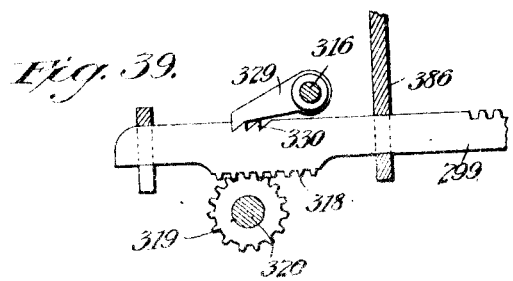
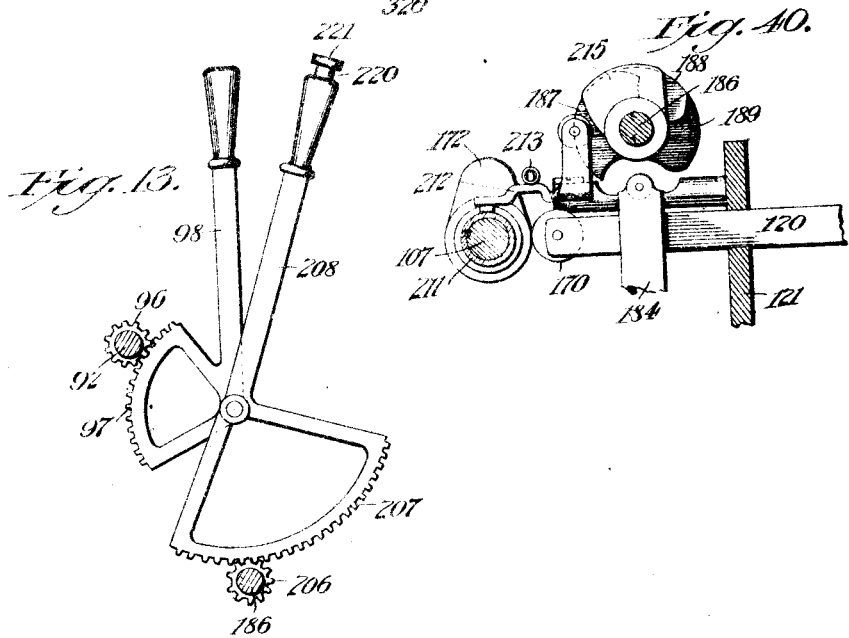
WITNESSES
INVENTOR
Charles Donat Richard
By his Attorney

C. D. RICHARD.
CHANGE MAKING CASH REGISTER.
APPLICATION FILED NOV. 1, 1912.

1,175,297.

Patented Mar. 14, 1916.
21 SHEETS—SHEET 10.

Inventor
Charles Donat Richard.

Witnesses

By
Attorney

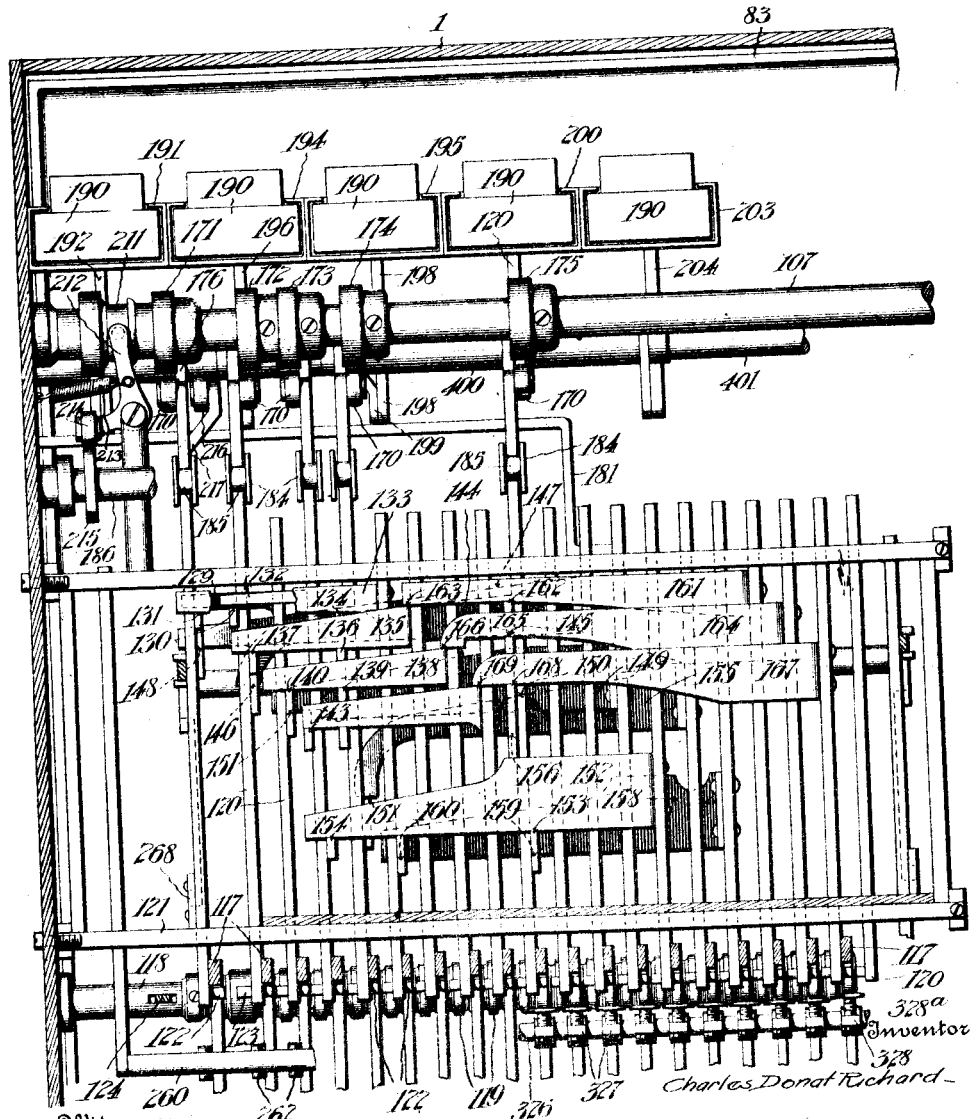

C. D. RICHARD.
CHANGE MAKING CASH REGISTER.
APPLICATION FILED NOV. 1, 1912.
1,175,297.
Patented Mar. 14, 1916.
21 SHEETS—SHEET 12.
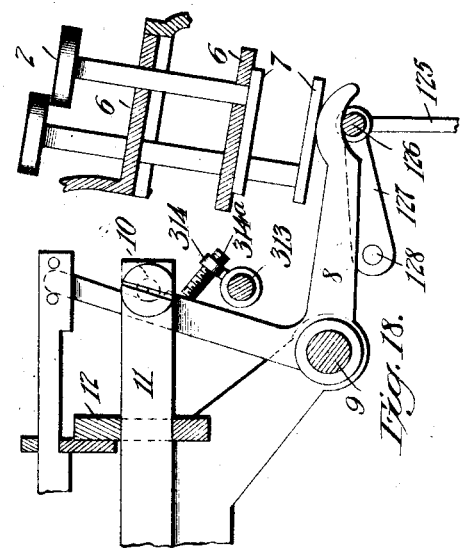
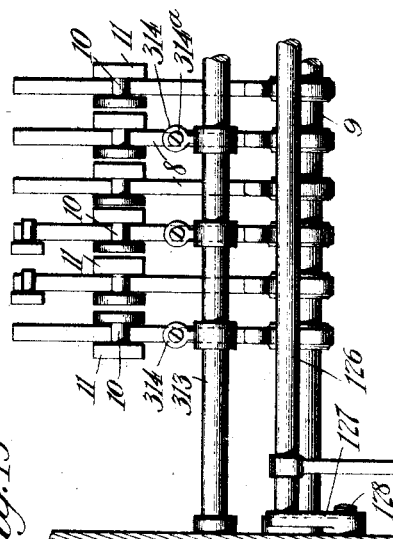
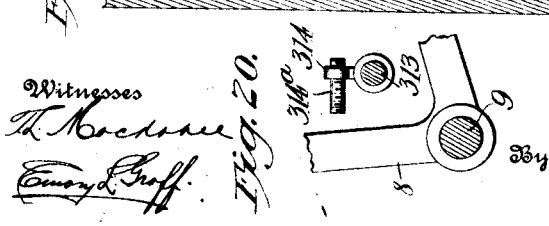
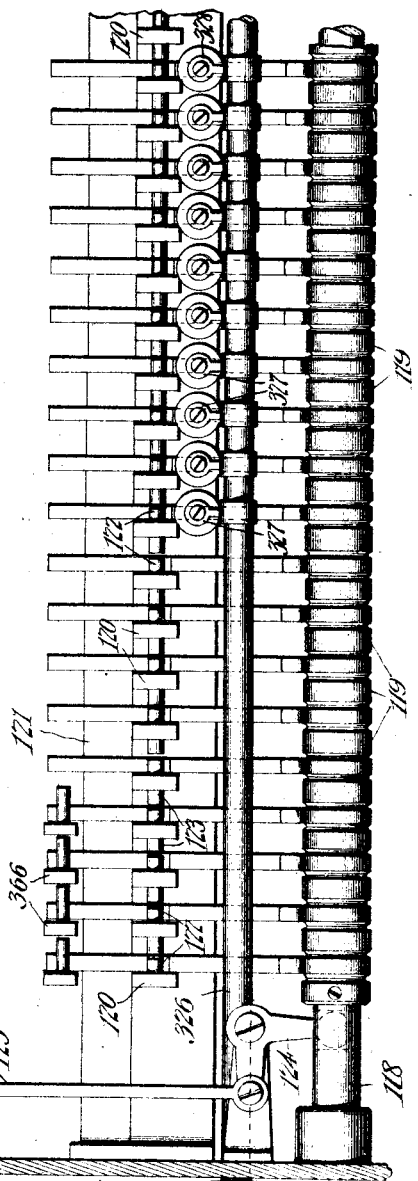

C. D. RICHARD.
CHANGE MAKING CASH REGISTER.
APPLICATION FILED NOV. 1, 1912.

1,175,297.

Patented Mar. 14, 1916.
21 SHEETS—SHEET 13.

Inventor
Charles Donat Richard

Witnesses

By

Attorney

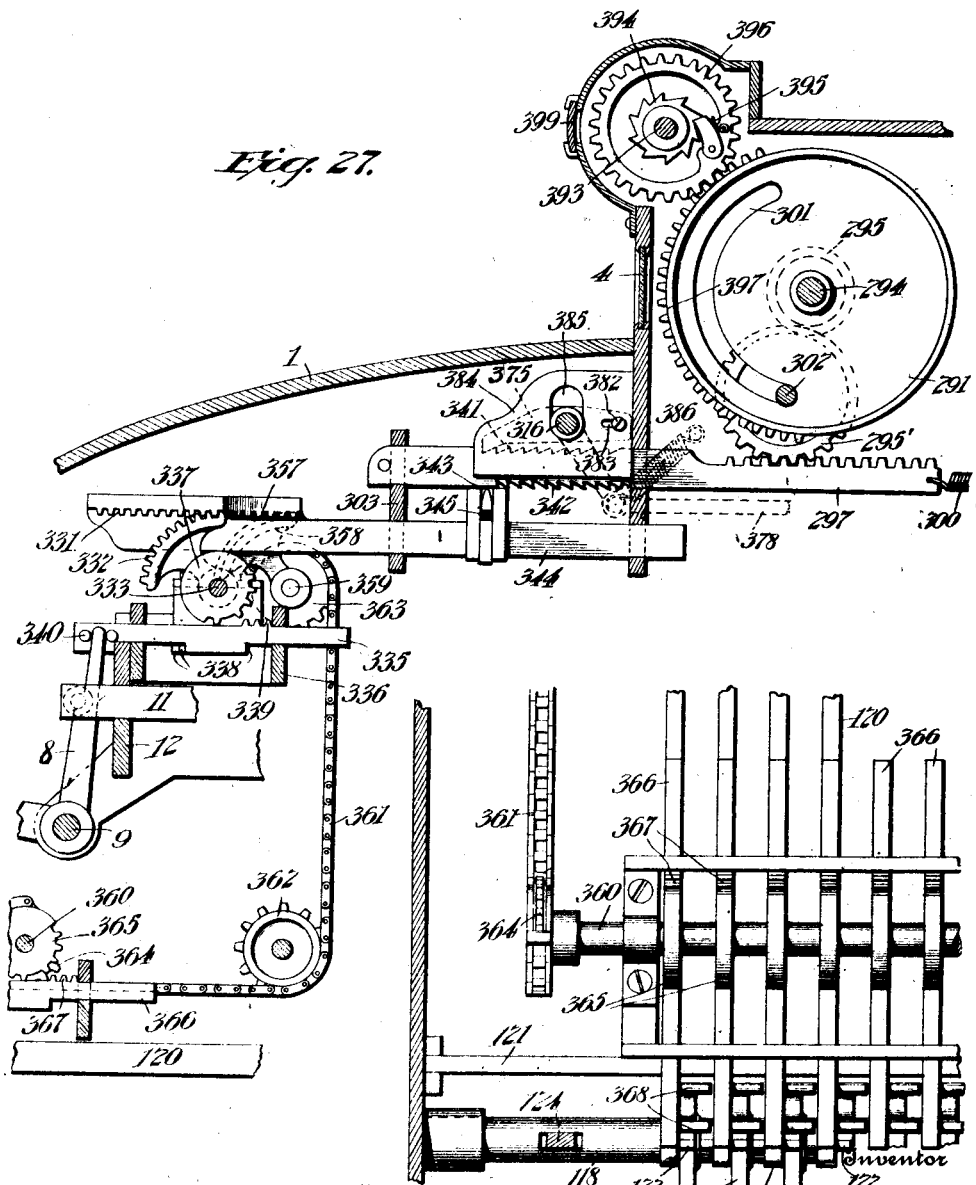

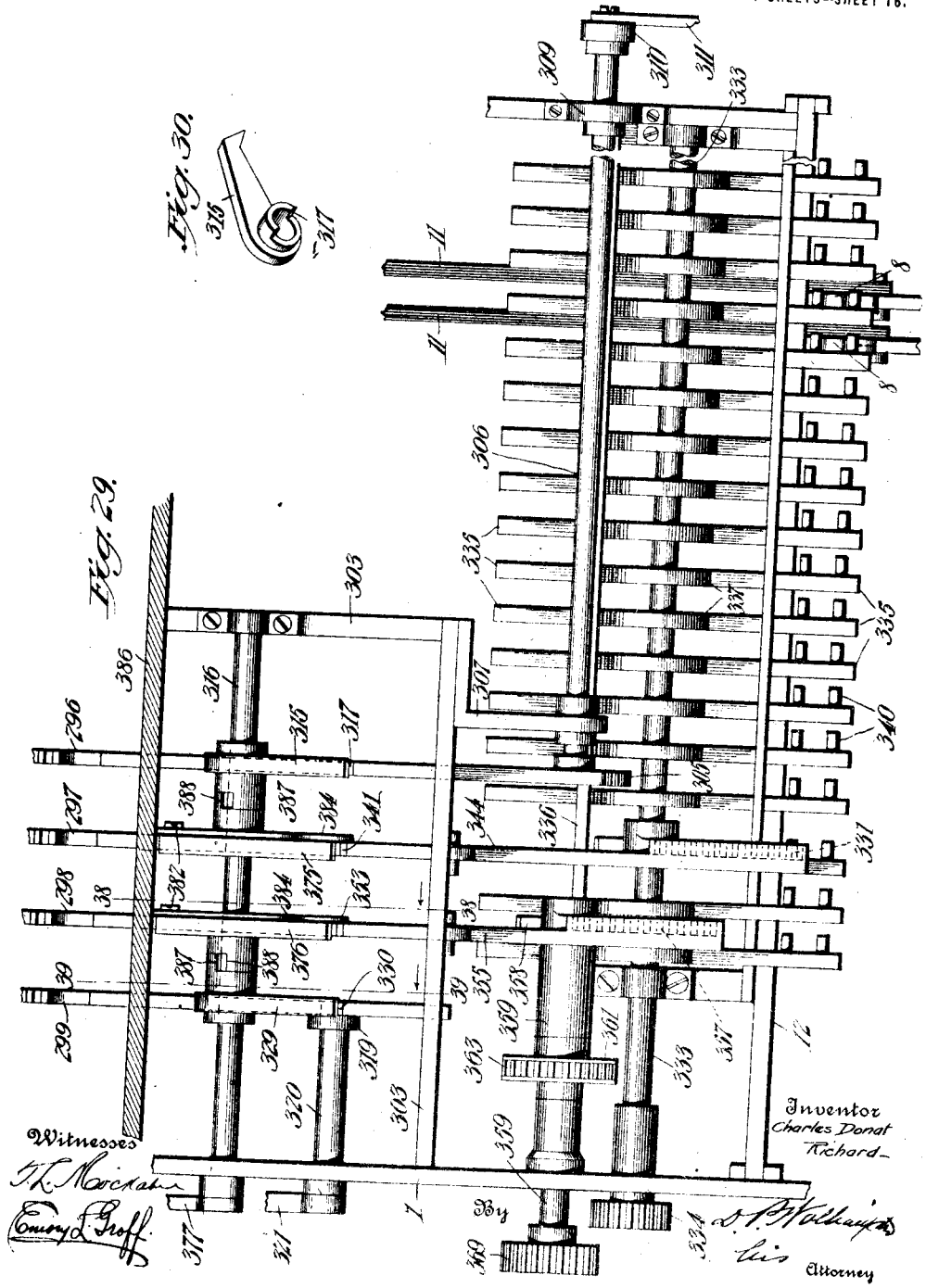

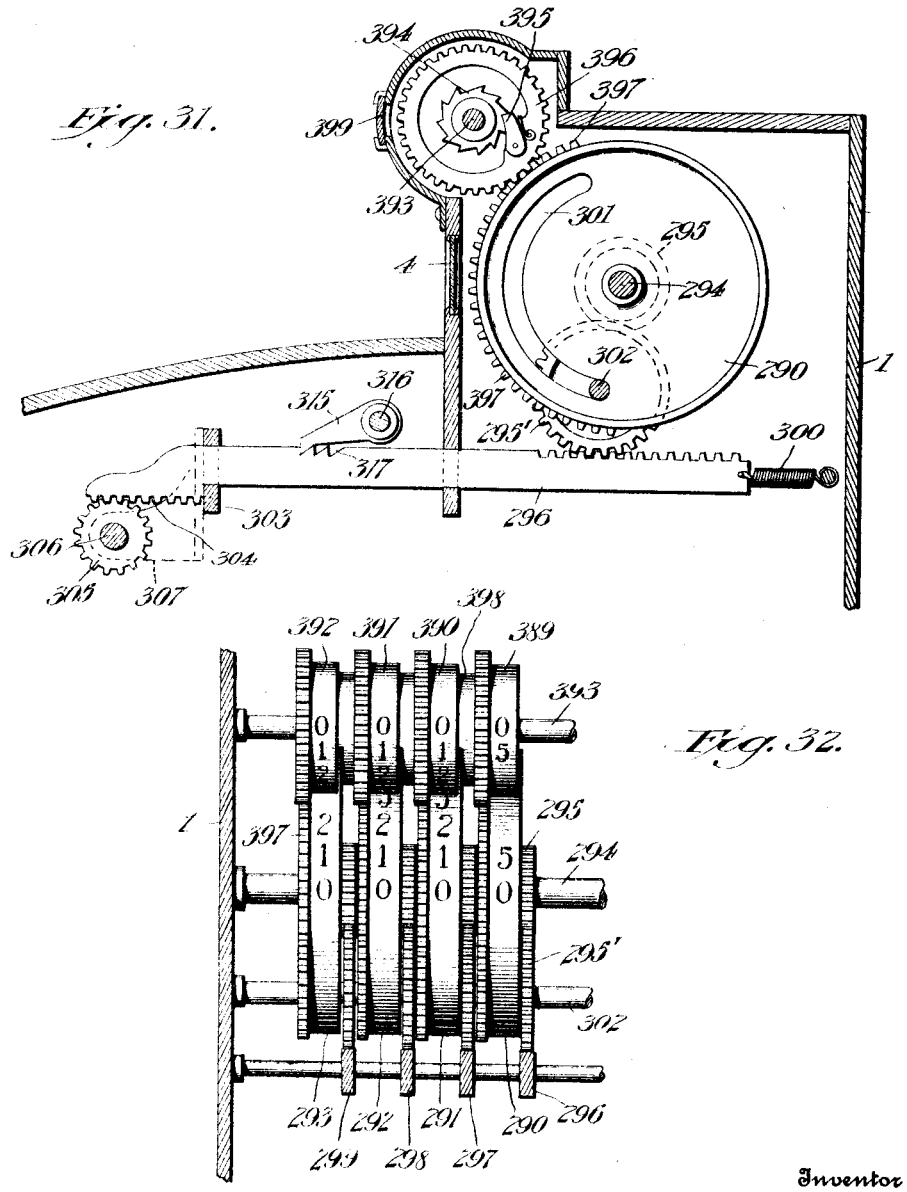

C. D. RICHARD.
CHANGE MAKING CASH REGISTER.
APPLICATION FILED NOV. 1, 1912.

1,175,297.

Patented Mar. 14, 1916.
21 SHEETS—SHEET 18.

Fig. 33.

WITNESSES

INVENTOR
Charles Donat Richard
By
his Attorney

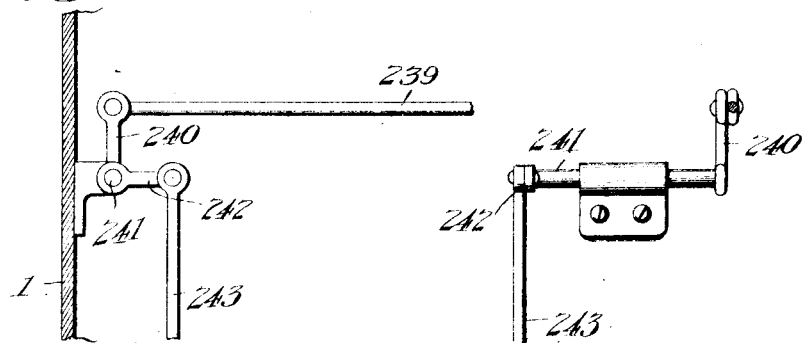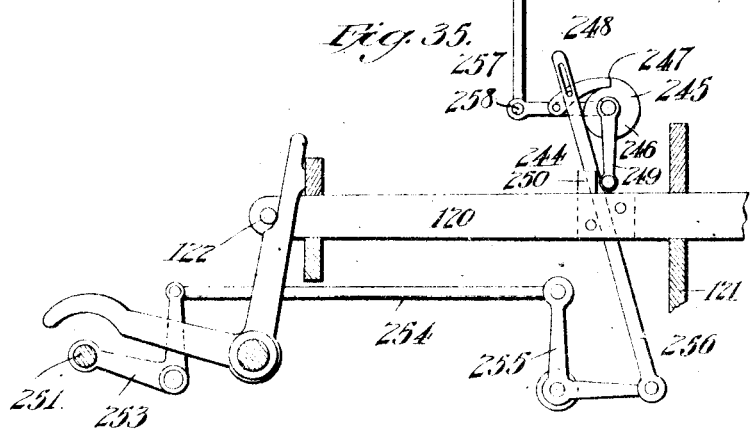

C. D. RICHARD.
CHANGE MAKING CASH REGISTER.
APPLICATION FILED NOV. 1, 1912.
1,175,297.
Patented Mar. 14, 1916.
21 SHEETS—SHEET 20.
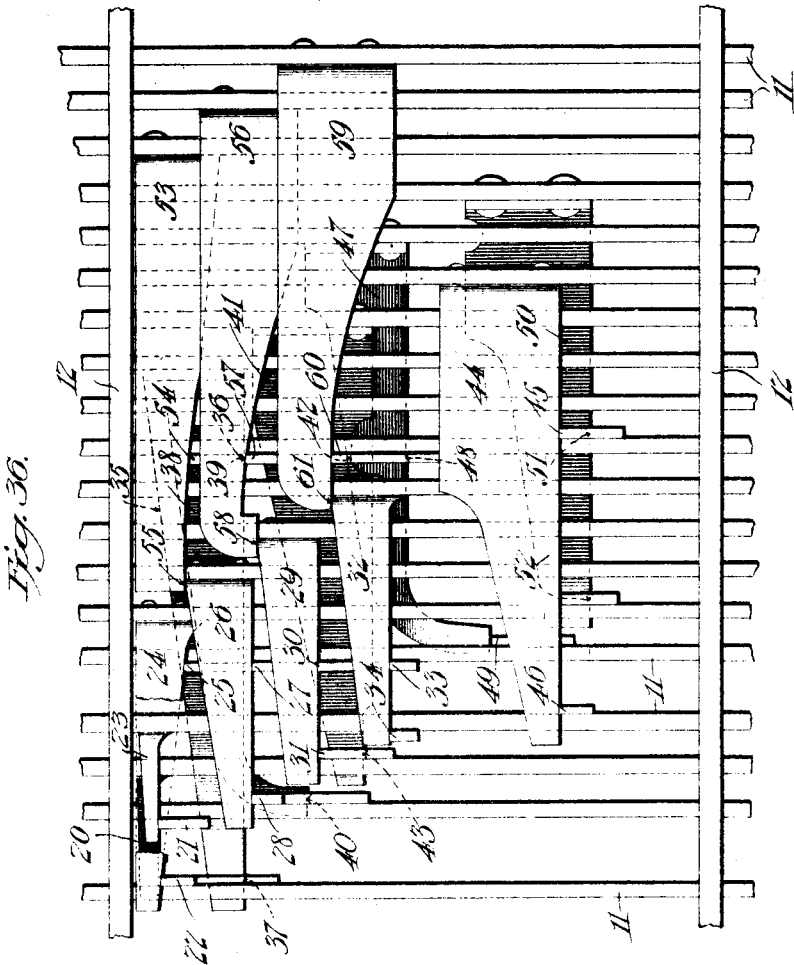

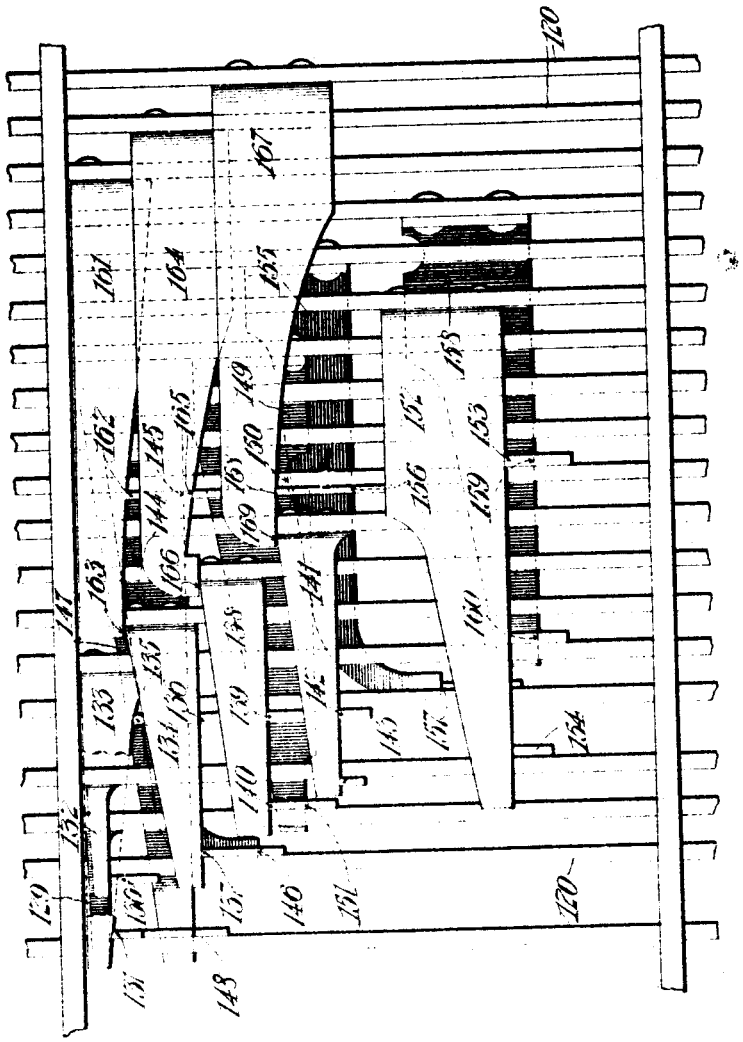

UNITED STATES PATENT OFFICE

CHARLES D. RICHARD, OF NEW YORK, N. Y., ASSIGNOR TO FRANÇOIS DUCASSE, OF NEW YORK, N. Y.

CHANGE-MAKING CASH-REGISTER.

1,175,297. Specification of Letters Patent. Patented Mar. 14, 1916.

Application filed November 1, 1912. Serial No. 729,180.

*To all whom it may concern:*

Be it known that I, CHARLES D. RICHARD, a citizen of the Republic of France, residing at New York, in the county of New York and State of New York, have invented certain new and useful Improvements in Change-Making Cash-Registers, of which the following is a specification.

The present invention relates to a combined cash register and change making machine which embodies novel features of the construction whereby the amount of the purchase is registered and the necessary amount of change automatically delivered, the amount of the change being the difference between the amount of the purchase and the amount tendered in payment therefor.

Among the objects of the invention is to provide a machine of this character which is compact and durable in its construction, which can be easily and quickly manipulated, which is accurate and reliable in its operation, and which eliminates the necessity for any arithmetical calculations on the part of the salesman.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 2:
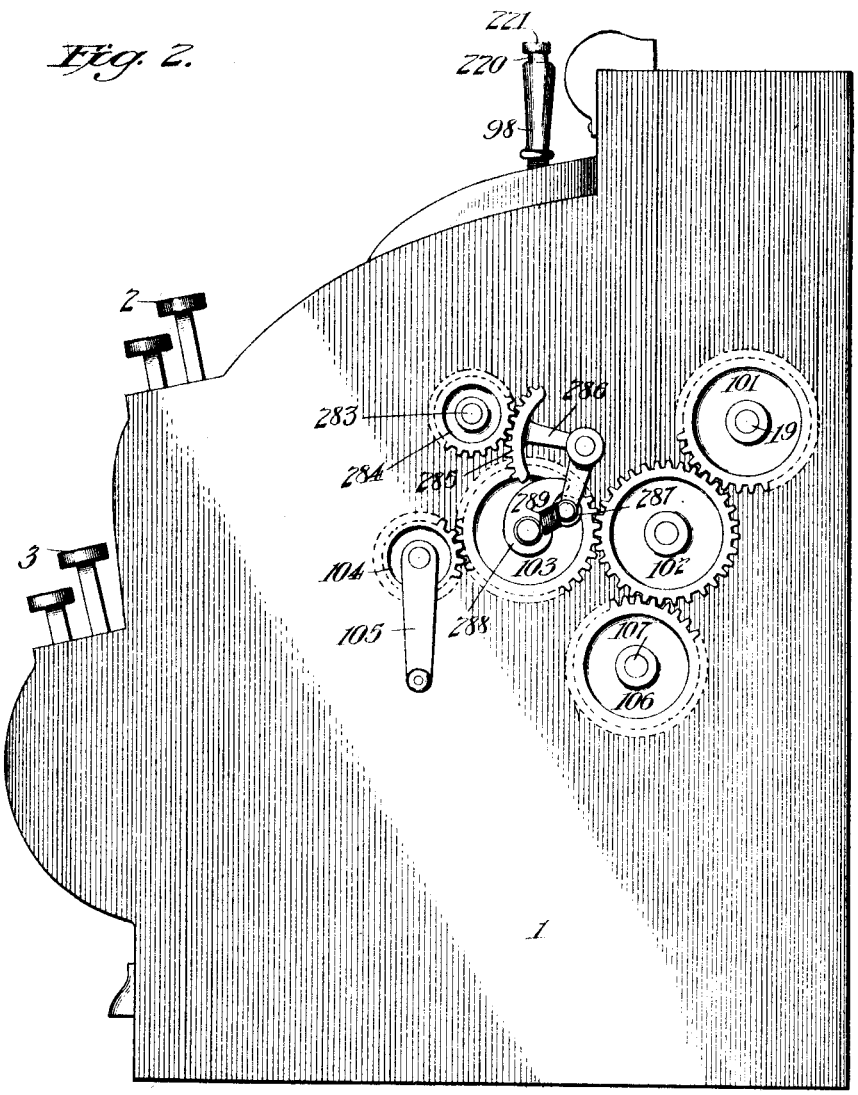
Figure 3:
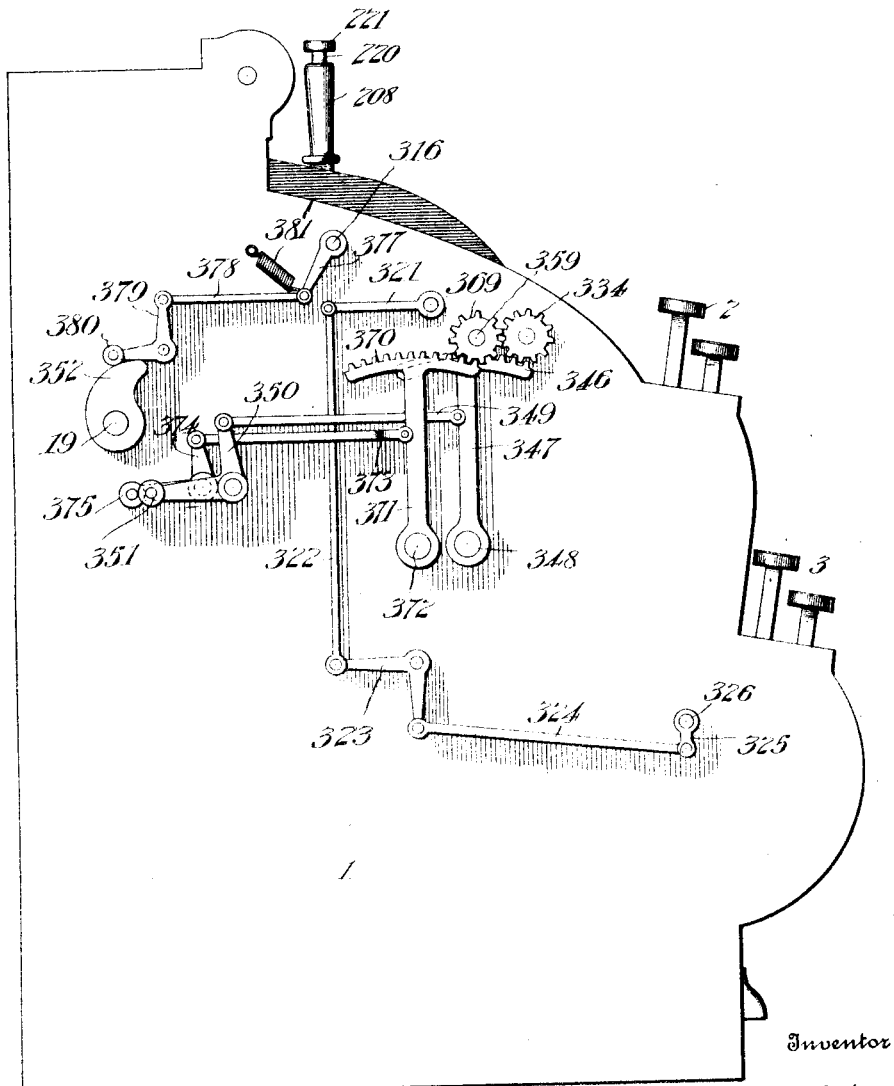
Figure 4:
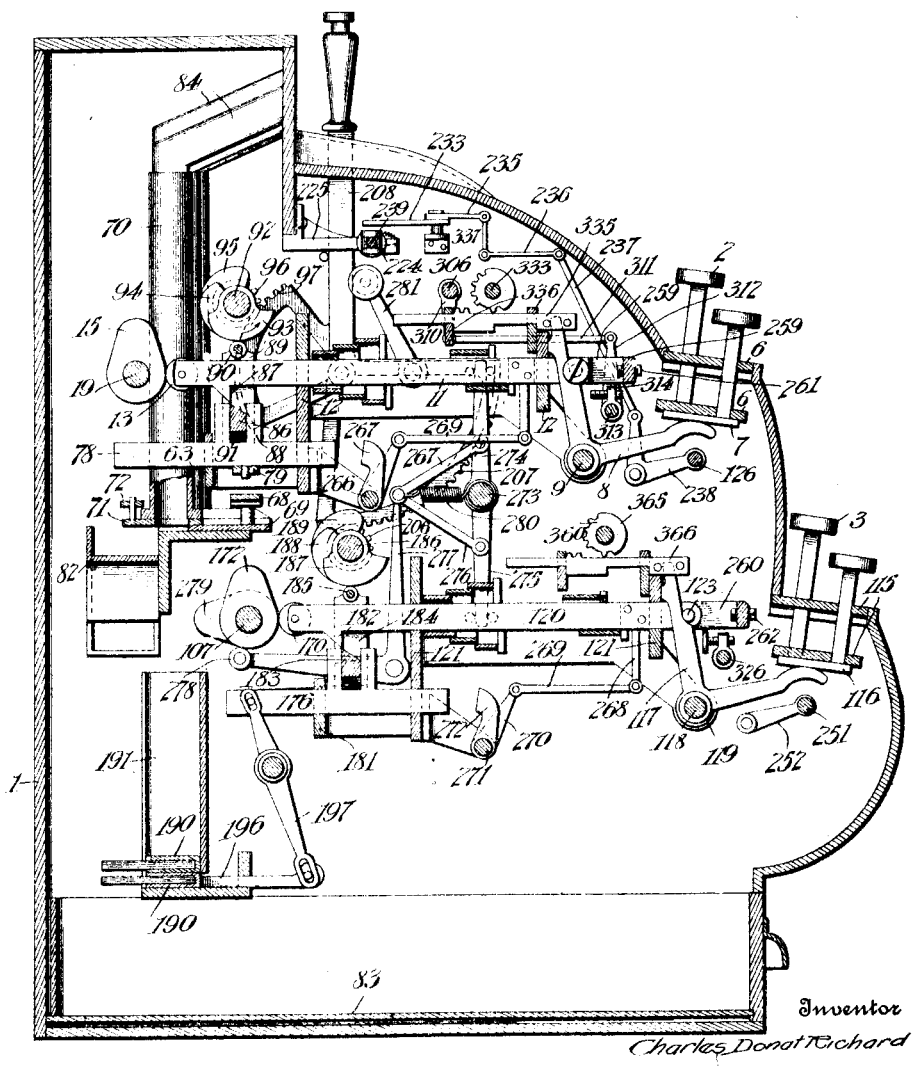
Figure 5:
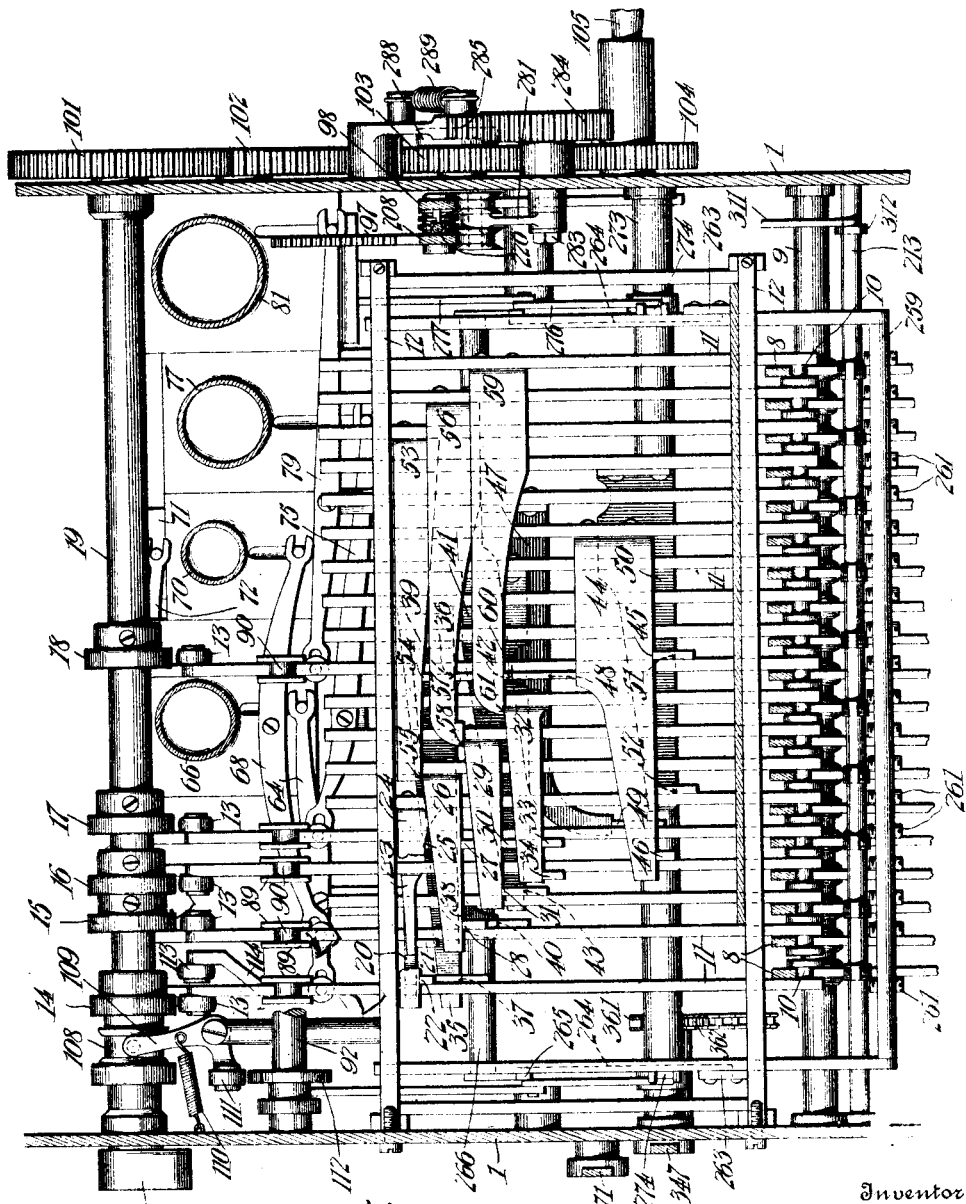
Figure 6:
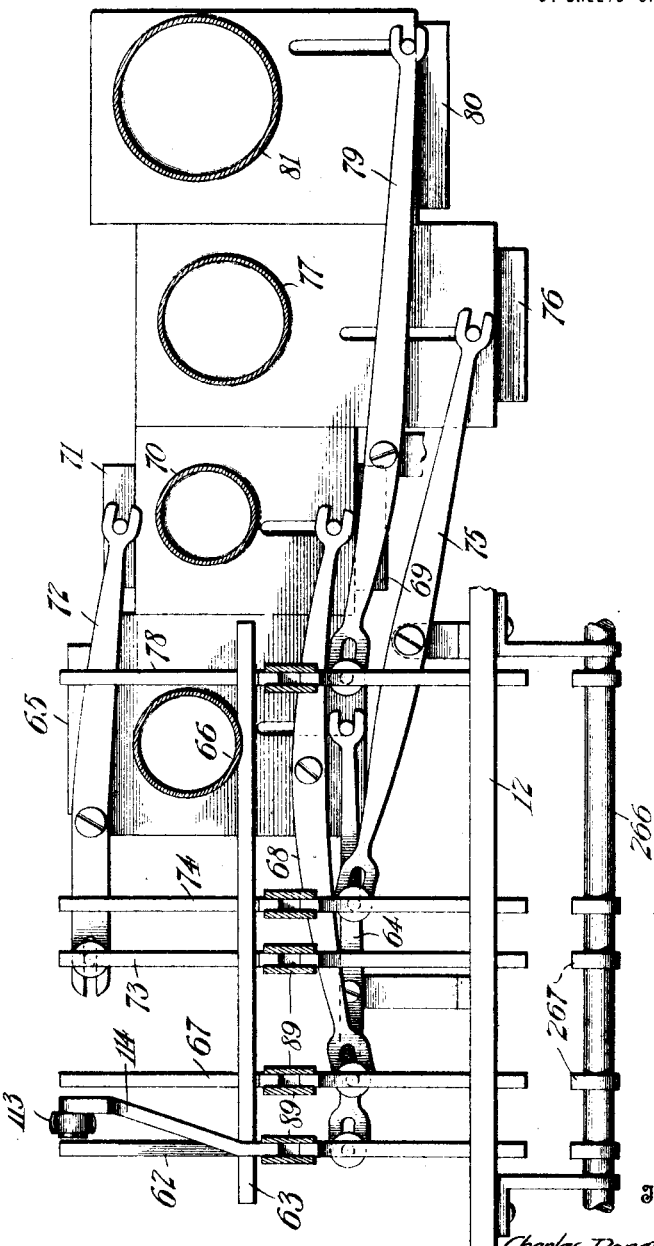
Figure 14:
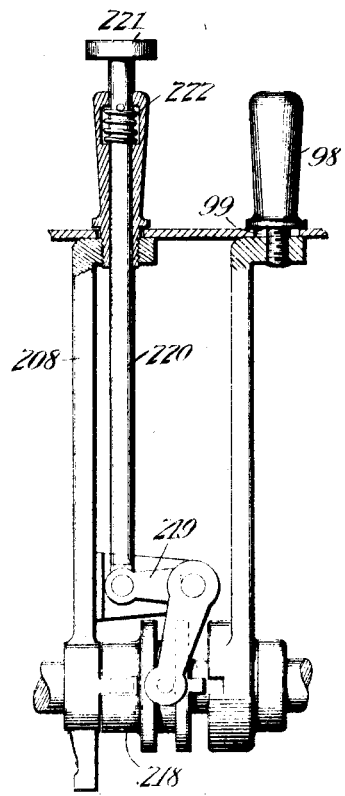
Figure 15:
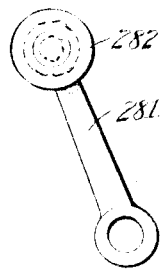
Figure 16:
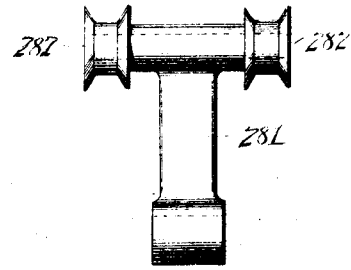
Figure 21:
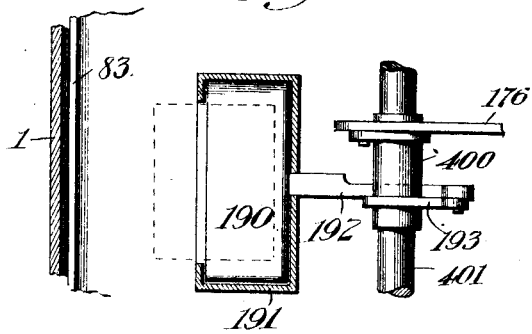
Figure 25:
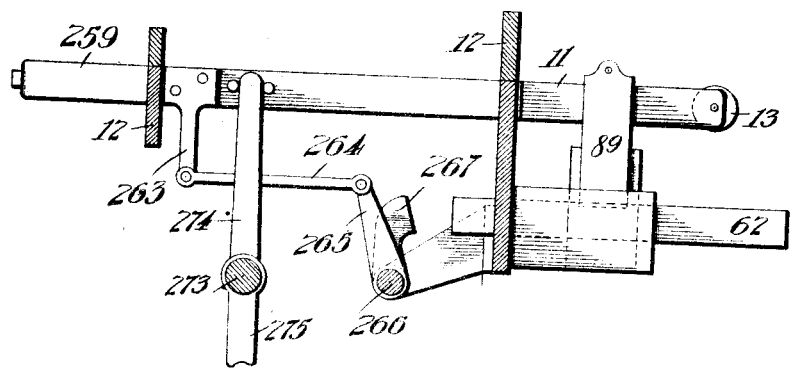
Figure 26:
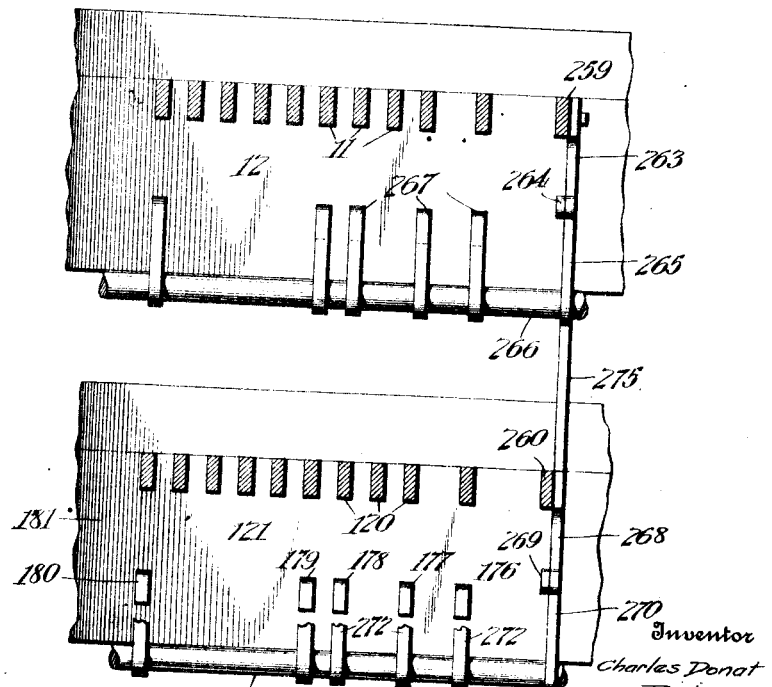

Figure 1 is a front elevation of a combined cash register and change making machine constructed in accordance with the invention. Fig. 2 is an end view of the same showing the main crank and the gearing between the same and the ejecting mechanism and resetting mechanism. Fig. 3 is an elevation of the opposite end of the machine. Fig. 4 is a longitudinal vertical sectional view through the machine. Fig. 5 is a horizontal sectional view taken over the cents mechanism. Fig. 6 is an enlarged detail view of the cents ejecting mechanism. Fig. 7 is a detail sectional view showing one of the latch members in normal position, the said latch member being pushed downwardly by the cam member. Fig. 8 is a similar view showing the latch in the position assumed when released by the cam member. Fig. 9 is an enlarged detached perspective view of one of the latch members. Figs. 10 and 11 are detail views of the mechanism for shifting the five cent ejecting cam, the said cam being shown in normal position by Fig. 10, and in the position assumed when giving five cents change upon a five cent purchase when ten cents is tendered, by Fig. 11. Fig. 12 is a sectional view on the line 12—12 of Fig. 10. Fig. 13 is a detail view of the indicator levers and segments. Fig. 14 is an enlarged detail view of the cents lever and dollars lever which are actuated according to the amount tendered. Figs. 15 and 16 are detail views of the resetting lever for moving the cents lever and dollar lever back to the zero position. Fig. 17 is a horizontal sectional view taken over the dollars mechanism, a portion of one end and the front of the machine being removed. Fig. 18 is a fragmentary vertical sectional view showing one of the cents bell crank levers and the members associated therewith. Fig. 19 is a fragmentary transverse sectional view showing the connection between the bell crank levers of the cents mechanism and the bell crank levers of the dollars mechanism, as well as the parts of the registering mechanism which are actuated by the bell crank levers. Fig. 20 is a detail view of the twenty dollar bell crank lever and the register actuating member coöperating therewith. Figs. 21, 22, 23, and 24 are detail views of the dollars ejecting mechanism. Figs. 25 and 26 are detail views of the resetting mechanism. Fig. 27 is a longitudinal vertical sectional view through the upper portion of the machine, showing parts of the registering mechanism. Fig. 28 is a fragmentary horizontal sectional view showing the connection between the dollars mechanism and the registering device. Fig. 29 is a plan view of the register mechanism for the cents keys. Fig. 30 is a detail view of one of the pawls which are used for holding the drum operating slides in a retracted position. Fig. 31 is a vertical sectional view through the totalizer and register. Fig. 32 is a detail view showing the connection between the register and the totalizer. Figs. 33, 34, and 35 are detail views of the mechanism for cutting out the one dollar ejecting mechanism when a purchase less than one dollar is made and five dollars or more is tendered in payment therefor. Fig. 36 is an enlarged plan view of the cents selective mechanism. Fig. 37 is a similar view of the dollars selective mechanism. Fig. 38 is a detail sectional view on the line 38—38 of Fig. 29. Fig. 39 is a detail sectional view on the line 39—39 of Fig. 29. Fig. 40 is a view similar to Fig. 12 showing the cam for cutting out the one dollar bar.

Corresponding and like parts are referred to in the following description and indicated in all the views of the drawings by the same reference characters.

For the purpose of illustration, I have shown a machine which will operate successfully between the limits of five cents and twenty dollars provided the purchase is always five cents or some multiple thereof, the said machine serving both to register the amount of the purchase and to deliver automatically the proper amount of change or the difference between the amount purchased and the amount tendered. It will be obvious, however, that the scope of the machine may be readily made either greater or less as may be found most advantageous, without departing in any manner from the spirit of the invention.

Specifically describing the present embodiment of the invention, the numeral 1 designates the main casing of the machine upon which the mechanism is mounted. The front of the machine is provided with a bank of cents keys 2 which range in value from five cents to ninety-five cents, and also with a second bank of dollars keys 3 which range in value from one dollar to twenty dollars. The amount of the purchase is registered by the operation of these keys 2 and 3 and is indicated by proper numerals which are visible through the sight opening 4 at the top of the casing. The cents keys 2 are mounted for movement in a substantially vertical direction (see Figs. 4 and 5) and are formed with stems which slide freely through guide openings in the spaced bars 6. The lower end of each of the cents keys is provided with a shoe 7 which is adapted to engage one arm of a bell crank lever 8, the said bell crank levers 8 being mounted upon a shaft 9 and the opposite arms thereof engaging pins 10 upon the cents slides 11. One of these slides 11 is provided for each of the keys 2, the said slides being suitably mounted upon the guides 12 so that when any one of the cents keys 2 is depressed, the corresponding cents slide 11 will be withdrawn or moved longitudinally toward the front of the machine. The slides 11 for the five cent, ten cent, twenty cent, twenty-five cent, and fifty cent keys are extended rearwardly beyond the remainder of the slides 11 and provided with the rollers 13. These main slides 11 which are provided with the rollers 13 may be for convenience termed the basic slides since they represent the primary cash values, all of the higher values being built up by different combinations of these primary values. The roller 13 of the five cent slide is adapted to be engaged by an ejecting cam 14, the roller 13 of the ten cent slide by an ejecting cam 15, the roller 13 of the twenty cent slide by an ejecting cam 16, the roller 13 of the twenty-five cent slide by an ejecting cam 17 and the roller 13 of the fifty-cent slide by an ejecting cam 18, the said ejecting cams being all mounted upon a transverse shaft 19 which is journaled between the ends of the casing.

Means is provided whereby when any one of the cents keys 2 is depressed to withdraw the corresponding slide 11, one or more of the basic slides 11 having an aggregate value equivalent to the value of the depressed key will be withdrawn or moved toward the front of the machine. For this purpose, certain of the cents slides 11 are provided with lateral arms which extend over and are adapted to engage abutments upon other slides so as to simultaneously withdraw the same when the first slide is withdrawn. The fifteen cent slide is provided with an arm 20 which is adapted to engage an abutment 21 on the ten cent slide and an abutment 22 on the five cent slide. It will thus be obvious that when the fifteen cent slide is withdrawn, the arm 20 will serve to simultaneously withdraw both the ten cent slide and the five cent slide. The twenty cent slide is provided with an arm 23 which is also adapted to engage the abutment 21 on the ten cent slide. The thirty cent slide is provided with an arm 24 which is adapted to engage an abutment 25 on the twenty-five cent slide and the abutment 22 on the five cent slide. The thirty-five cent slide is provided with an arm 26 which is adapted to engage an abutment 27 upon the twenty-five cent slide and an abutment 28 on the ten cent slide. The forty cent slide is provided with an arm 29 which is adapted to engage an abutment 30 upon the twenty-five cent slide and an abutment 31 upon the fifteen cent slide. The forty-five cent slide is provided with an arm 32 adapted to engage an abutment 33 upon the twenty-five cent slide and an abutment 34 on the twenty cent slide. The fifty-five cent slide is provided with an arm 35 which extends under the various slides and is adapted to engage an abutment 36 on the fifty-cent slide and an abutment 37 on the five cent slide. The sixty cent slide is provided with an arm 38 adapted to engage a shoulder 39 on the fifty cent slide and a shoulder 40 on the ten cent slide. The sixty-five cent slide is provided with an arm 41 which is adapted to engage a shoulder 42 on the fifty cent slide and a shoulder 43 on the fifteen cent slide. The seventy cent slide is provided with an arm 44 adapted to engage an abutment 45 on the fifty cent slide and an abutment 46 on the twenty cent slide. The seventy-five cent slide is provided with an arm 47 adapted to engage an abutment 48 on the fifty-cent slide and an abutment 49 on the twenty-five cent slide. The eighty-cent slide is provided with an arm 50 adapted to engage an abutment 51 on the fifty cent slide and an abutment 52 on the thirty cent slide. The eighty-five cent slide is provided with an arm 53 adapted to engage an abutment 54 on the fifty cent slide and an abutment 55 on the thirty-five cent slide. The ninety cent slide is provided with an arm 56 adapted to engage an abutment 57 on the fifty cent slide and an abutment 58 on the forty cent slide. The ninety-five cent slide is provided with an arm 59 adapted to engage an abutment 60 on the fifty-cent slide and an abutment 61 on the forty-five cent slide. It will thus be obvious that when any one of the cents keys 2 is depressed, so as to withdraw one of the cents slides 11, the arrangement of arms and abutments will serve to simultaneously withdraw basic slides having an aggregate value equal to that of the depressed key.

An ejection operating slide 62 (see Figs. 4 and 5) which is mounted upon a suitable guide 63 is arranged directly under the rear end of the five cent slide 11, the said ejection operating slide 62 having an operative connection through the medium of a lever 64 with an ejecting slide 65 which is arranged at the base of a coin tube 66 adapted to contain five cent pieces. A similar ejection operating slide 67 is arranged under the rear end of the ten cent slide and connected by means of a lever 68 to an ejecting slide 69 which operates at the base of a coin chute 70 which is adapted to receive ten cent pieces. A second ejecting slide 71 is also provided at the base of the ten cent tube, the said ejecting slides 69 and 71 being adapted to be operated either simultaneously or independently of each other, according to whether or not it is desired to eject one ten cent piece or two ten cent pieces. This second ten cent ejecting slide 71 is connected by a lever 72 to an ejection controlling slide 73 which is mounted directly under the rear end of the twenty cent slide 11. An ejection controlling slide 74 is also mounted under the rear end of the twenty-five cent slide 11, and connected by a lever 75 to the ejecting slide 76 of a twenty-five cent coin tube 77. In a similar manner, an ejection controlling slide 78 is mounted under the rear end of the fifty-cent slide 11 and connected by a lever 79 to the ejecting slide 80 of a fifty-cent coin tube 81. It will thus be obvious that when any one of the ejection operating slides is reciprocated forwardly and then rearwardly, the corresponding ejecting slide will be caused to force a coin out of the coin tube. The ejected coins may drop into a suitable chute 82 and be delivered thereby into a drawer or suitable receptacle 83 at the base of the machine. The upper ends of the various coin holding tubes are shown as connected by the inclined coin guides 84 to corresponding slots 85 in the front of the machine at the top thereof. These coin slots 85 provide a ready means for inserting coin into the coin holding tubes when such becomes necessary.

Each of the ejection operating slides 62, 67, 73, 74 and 78 is provided with a spring latch 86 which is adapted to engage a shoulder 87 upon the corresponding cents slide 11, or otherwise produce an interlocking connection with the corresponding cents slide, so that when the latch is in operative position and the cents slide is actuated, the ejection operating slide will also be actuated and eject a coin. These latches 86 are shown as slidably mounted for vertical movement between spaced arms 88 which project upwardly from the ejection operating slides. Side pieces 89 which are carried by the latch members 86 fit upon opposite sides of the arms 88 so as to direct the latches in their up and down movements and hold them against lateral displacement. It will also be observed that the side pieces 89 for each of the latches extend upwardly on opposite sides of and above the corresponding cents slide 11 and have a roller 90 journaled between the upper extremities thereof. A spring 91 is interposed between the base of each of the latches 86 and the ejection operating slide, the said springs normally tending to move the latches upwardly into engagement with the shoulders 87 of the cents slides 11. The various latches 86, however, are normally held in a depressed and inoperative position, by reason of the engagement of the rollers 90 with suitable cams upon a cam shaft 92 which extends transversely across the rear ends of the cents slides 11. This shaft 92 is provided with three cams 93 which are arranged over the five cent, ten cent, and twenty cent slides 11, a cam 94 which is arranged over the twenty-five cent slide and a cam 95 which is arranged over the fifty cent slide. These cams normally assume the position shown by Fig. 7 so as to depress all of the latch members 86 and hold the same in inoperative position so that any one or all of the cents slides 11 can be operated without also actuating the ejection operating slides and causing the ejection of coins. The three cams 93 are all of the same length, and are comparatively short, the twenty-five cent cam 94 being longer than the cams 93, while the fifty cent cam 95 is longer than the twenty-five cent cam 94. It will thus be obvious that by rotating the shaft 92, the three cams 93 are first moved out of engagement with the rollers 90 so as to release the latches 86 of the five cent and two ten cent ejection operating slides while a further rotation of the shaft serves to also release the latch of the twenty-five cent ejection operating slide, and a still further rotation serves to also release the latch of the fifty-cent ejection operating slide. The position assumed by the cams when all of the latches have been released is clearly indicated by Fig. 8.

The shaft 92 (see Fig. 4) carrying the latch controlling cams of the cents mechanism is provided at one end thereof with a gear wheel 96, which meshes with a segmental rack 97 rigid with and operated by the cents lever 98, the upper end of the cents lever projecting through a slot 99 in the casing and a suitable scale 100 being provided upon one side of the slot the graduations on said scale ranging from zero to one hundred. Where the purchase is one dollar or less, only the cents mechanism comes into operation, the amount of the purchase being registered by operating the corresponding cents key 2, and the cents lever 98 being then moved to a point upon the scale 100 corresponding to the amount tendered in payment for the purchase. This movement of the cents lever 98 serves to rotate the shaft 92 so as to release any of the latch members 86 which may be necessary to obtain the proper amount of change. The actual ejection of the coins is produced by rotation of the shaft 19 upon which the various ejecting cams 14, 15, 16, 17 and 18 are mounted. One end of this shaft extends through the end of the casing and is provided with a gear wheel 101, the said gear wheel receiving motion through the medium of the gears 102 and 103 from a gear 104 which is operated by means of the crank 105. The gear 102 also meshes with a gear 106 upon a shaft 107 which carries the ejecting cams for the dollars mechanism.

In order to explain the operation of the cents mechanism, let it be assumed that a 20 cent purchase has been made and 25 cents tendered in payment therefor. The operator would first depress the 20 cent key 2 and thereby withdraw the 20 cent slide 11. The arm 23 of this 20 cent slide would engage the abutments 24 of the 10 cent slide so that the 10 cent slide would be withdrawn simultaneously therewith. The latch members 86 of the ejection operating slides being all in an inoperative position, as indicated by Fig. 7, the 20 cent slide and 10 cent slide would be withdrawn without actuating either of the 10 cent ejection operating slides 67 or 73. The operator would next move the cents lever 98 to the point upon the scale 100 corresponding to the 25 cents which has been tendered in payment, and this movement of the cents lever would rotate the shaft 92 so as to swing the three cams 93 into an inoperative position and release the latch members 86 of the three ejection operating slides 62, 67 and 73. The operator would next turn the crank 105 and thereby rotate the shaft 19 so as to cause the various ejecting cams 14, 15, 16, 17 and 18 to engage the corresponding rollers or guide members 13 and actuate all of the basic cents slides 11 which were not pushed forward in the first place by the actuation of the cents key. The various cents slides 11 which are provided with the extensions and rollers 13, namely the 5 cent slide, 10 cent slide, 20 cent slide, 25 cent slide and 50 cent slide have been for convenience termed the basic cent slides, since these are the slides which are always actuated by the ejecting cams to eject the amount of change. In the present instance, the 20 cent slide and 10 cent slide had been previously retracted or withdrawn by operation of the 20 cent key, and the latches of the 25 cent slide and 50 cent slide were still in an inoperative position. The latch of the 5 cent slide had, however, been released, as well as the latch of the two 10 cent ejection operating slides 67 and 73. The 10 cent slide and 20 cent slide had been withdrawn by the action of the cents key before the operation of the crank 105 and before the cents lever 98 had been manipulated to release any of the latches 86. Upon the forward movement of the 5 cent slide 11, caused by the action of the ejecting cam 14, the ejection operating slide 62 is simultaneously moved forward and coin ejected from the 5 cent tube 66. The 10 cent and 20 cent slides having previously been operated by the action of the 20 cent key, these slides are not operated by the ejecting cams 15 and 16. The ejecting cams 17 and 18 move the 25 cent slide and 50 cent slide forward, although owing to the fact that the latches 86 for these slides are still held in an inoperative position by the cams 94 and 95, the ejection operating slides 74 and 78 for coins of 25 and 50 cent denomination are not actuated. The proper amount of change, namely 5 cents, is correctly discharged from the machine.

As a further example, let it be supposed that a 35 cent purchase has been made and 50 cents tendered in payment therefor. The operator depresses the 35 cent key and thereby withdraws the 35 cent slide. The arm 26 upon this slide serves also to withdraw the 25 cent slide and the 10 cent slide. Of the basic slides, there accordingly, remains unmoved the 5 cent slide, the 20 cent slide, and the 50 cent slide. The operator next moves the cents lever to the 50 cent mark upon the scale 100, thereby turning the cam shaft 92 so as to move all of the latch controlling cams, with the exception of the 50 cent cam 95, into inoperative positions. All of the latches 86, with the exception of the 50 cent latch, are thereby released and forced into operative position by the springs 91. Upon rotation of the main crank 105 the cam shaft 19 is next rotated so as to cause the various ejecting cams thereon to push forward all of the basic cents slides which were not withdrawn by the operation of the 35 cent key. The 10 cent slide and 25 cent slide were withdrawn by the operation of the 35 cent key before the latches 86 were released, and the latch 86 of the 50 cent slide still remains inoperative, so that the ejecting cams push forward the 5 cent slide, 20 cent slide and 50 cent slide, the 50 cent slide moving independently of the ejection operating slide 78, while the 5 cent slide and 10 cent slide carry with them the operating slides 62 and 73. A 5 cent piece and a 10 cent piece are thus ejected, thereby giving the correct amount of change which is 15 cents.

As a still further example let it be supposed that a 75 cent purchase has been made and one dollar tendered in payment therefor. The operator first depresses the 75 cent key and thereby withdraws the 75 cent slide which carries with it both the 50 cent slide and the 25 cent slide. The cents lever 98 is next moved to the 100 or dollar mark on the scale 100, thereby rotating all of the latch controlling cams 93, 94 and 95 into inoperative positions and releasing all of the latches 86. Upon rotation of the crank 105 the various ejecting cams upon the shaft 19 are now caused to force the 5 cent slide, 10 cent slide and 20 cent slide forward, the 25 cent slide and 50 cent slide having been previously moved forward by the depression of the 75 cent key. All of the latches 86 having been released, the 5 cent slide, 10 cent slide and 20 cent slide will carry with them the respective ejection operating slides 62, 67 and 73, the said slides serving to eject two dimes and one nickel, or 25 cents which is the proper amount of change.

A special arrangement is necessary where a 5 cent purchase is made and 10 cents tendered in payment therefor. (See Figs. 10, 11, and 12.) The 5 cent ejecting cam 14 is formed in connection with a sleeve 108 which has a feather and spline connection with the shaft 19 and is adapted to be moved longitudinally by means of a bell crank shifting lever 109. A spring 110 which is connected to the bell crank lever 109 normally tends to hold the sleeve 108 in such a position that the cam 14 will engage the roller 13 of the 5 cent slide when the ejecting shaft 19 is rotated. One arm of the shifting lever 109 is provided with a roller or guide member 111 which is adapted to be engaged by a special 10 cent cam 112 on the shaft 92. When this cam 112 engages the roller 111 of the shifter lever 109, the sleeve 108 is moved longitudinally upon the shaft 19 to bring the 5 cent ejecting cam 14 opposite a roller 113 on an arm 114 which projects upwardly from the 5 cent ejection operating slide 62. This special 10 cent cam 112 has a sharp formation, and the latch controlling cams 93, 94 and 95 are all in operative position so as to hold all of the latches 86 depressed when the special 10 cent cam 112 causes the shifting lever 109 to throw the ejecting cam 14 opposite the roller 113. Under these conditions, it will be obvious that when the crank 105 is turned and the shaft 19 rotated, the cam 14 will engage the roller 113 and move the ejection operating slide 62 rearwardly so as to eject 5 cents. The remaining basic cents slides would all of them, with the exception of the 5 cent slide be moved forward by the respective ejecting cams, although the corresponding ejection operating slides would not be moved, owing to the fact that the latches 86 are all held in an inoperative position by the latch controlling cams. Should a 5 cent purchase be made and 10 cents tendered in payment therefor, the depression of the 5 cent key would withdraw the 5 cent slide, and the movement of the cents lever 98 to the 10 cent point upon the scale 100 would bring the special 10 cent cam 112 into operative position and move the ejecting cam 14 opposite the roller 113, without moving any of the latch controlling cams 93, 94, and 95 into inoperative positions. The operation of the crank 105 would then act, as previously explained, to eject 5 cents, the necessary amount of change.

At this point, it may be stated that one of the rules to be followed in operating the machine is to move the cents lever 98 to the point on the scale 100 corresponding to the denomination of the smallest coin which is tendered. For instance, should a 30 cent purchase be made and 35 cents tendered, the only manner in which the 35 cents could be tendered without making the exact change would be in the form of a 25 cent piece and a 10 cent piece. The 10 cent piece being the smallest denomination tendered, the cents lever 98 would be moved to the 10 cent point upon the scale 100, thereby giving 5 cents in change, as will be readily understood. Also, should a 45 cent purchase be made and 50 cents tendered in the form of two 25 cent pieces, the cents lever 98 would be moved to the 25 cent point upon the scale 100, following the above rule, although it is quite obvious that the same change would be tendered even should the cents lever be moved to the 50 cent point. On the other hand, should the 50 cents have been tendered in the form of five dimes, as is quite possible, the cents lever 98 would merely have been moved to the 10 cent point. In all three cases the proper change would have been given, although it is a uniform rule that the cents lever be moved to the point upon the scale 100 corresponding to the denomination of the smallest coin which is tendered in payment for the purchase.

The dollars keys 3, are identical in construction with the cents keys, being formed with stems which slide freely through guide openings in a pair of superposed bars 115. (See Figs. 4 and 17.) The lower ends of the keys are provided with shoes 116 which are adapted to engage and actuate the corresponding dollar bell crank levers 117. These various bell crank levers 117 are mounted to rotate upon a shaft 118, suitable collars 119 being provided between the various bell crank levers so that when the shaft is moved longitudinally, the bell crank levers will be shifted therewith in a body, although the various bell crank levers can rotate upon the shaft independently of each other. The dollars slides 120, corresponding to the cents slides 11, are mounted to reciprocate upon a frame 121, one of the said slides being provided for each of the keys, 3. The forward ends of the dollars slides 120 are provided with the lugs or shoulders 122 which are normally in engagement with the bell cranks 117. All of the dollar slides, with the exception of the one dollar slide, are also provided upon the opposite side thereof with the lugs or shoulders 123, the lugs 122 and 123 on adjacent slides being substantially in alinement with each other. The shaft 118 upon which the dollar bell cranks 117 are mounted, is arranged to slide longitudinally within its bearings. (See Figs. 18 and 19.) A bell crank shifting lever 124 has an operative connection with the shaft 118 for moving the same, the said bell crank shifting lever being connected by a link 125 to a rod 126 which extends under all of the cents bell crank levers 8. For the purpose of holding this rod 126 in proper position, one end thereof is connected to a swinging arm 127 which is pivoted upon one side of the casing at 128, while the opposite end of the rod is connected to a bell crank 238 pivoted upon the other side of the casing. It will thus be obvious that when any one of the cents bell crank levers is operated, the rod 126 will be moved down and the shifting lever 124 caused to slide the shaft 118 within its bearings. The various dollar bell cranks 117 will thus be moved out of engagement with the lugs 122 and into engagement with the lugs 123 of adjacent dollar slides. In other words, the 1 dollar bell crank will now engage the 2 dollar slide, the 2 dollar bell crank will now engage the 3 dollar slide, and so on. Thus, when making a one dollar and twenty-five cent purchase and tendering five dollars, the depression of the 25 cent bell crank would serve to shift all of the dollar bell cranks so that when the one dollar key was depressed, the one dollar bell crank would engage and withdraw the 2 dollar slide. The dollars mechanism would thus deduct the two dollars from the five dollars in making change, as will be hereinafter described, the proper change between the one dollar and a quarter and the two dollars being delivered by the cents mechanism.

The various dollar slides 120 are constructed with a system of lateral arms and abutments similar to that previously described in connection with the cents slides. (See Fig. 17.) The 3 dollar slide is provided with an arm 129 adapted to engage an abutment 130 on the 2 dollar slide and an abutment 131 on the 1 dollar slide. The 4 dollar slide is provided with an arm 132 adapted to engage the abutment 130 on the 2 dollar slide. The 6 dollar slide is provided with an arm 133 adapted to engage an abutment 134 on the 5 dollar slide and the abutment 131 on the 1 dollar slide. The 7 dollar slide is provided with an arm 135 adapted to engage an abutment 136 on the 5 dollar slide and an abutment 137 on the 2 dollar slide. The 8 dollar slide is provided with an arm 138 adapted to engage an abutment 139 on the 5 dollar slide and an abutment 140 on the 3 dollar slide. The 9 dollar slide is provided with an arm 141 adapted to engage an abutment 142 on the 5 dollar slide and an abutment 143 on the 4 dollar slide. The 11 dollar slide is provided with an arm 144 which is arranged under the slides and is adapted to engage an abutment 145 on the 10 dollar slide and an abutment 146 on the 1 dollar slide. The 12 dollar slide is provided with an arm 147, also extending under the slides, which is adapted to engage the abutment 145 on the 10 dollar slide, and an abutment 148 on the 2 dollar slide. The 13 dollar slide is provided with an arm 149 adapted to engage an abutment 150 on the 10 dollar slide and an abutment 151 on the 3 dollar slide. The 14 dollar slide is provided with an arm 152 adapted to engage an abutment 153 on the 10 dollar slide and an abutment 154 on the 4 dollar slide. The 15 dollar slide is provided with an arm 155 adapted to engage an abutment 156 on the 10 dollar slide and an abutment 157 on the 5 dollar slide. The 16 dollar slide is provided with an arm 158 adapted to engage an abutment 159 on the 10 dollar slide and an abutment 160 on the 6 dollar slide. The 17 dollar slide is provided with an arm 161 adapted to engage an abutment 162 on the 10 dollar slide and an abutment 163 on the 7 dollar slide. The 18 dollar slide is provided with an arm 164 adapted to engage an abutment 165 on the 10 dollar slide and an abutment 166 on the 8 dollar slide. The 19 dollar slide is provided with an arm 167 adapted to engage an abutment 168 on the 10 dollar slide and an abutment 169 on the 9 dollar slide. By this arrangement, it will be obvious that when any one of the dollars keys is depressed, and one of the dollar slides withdrawn, one or more of the basic dollars slides, having an aggregate value equal to the value of the highest dollar slide withdrawn, will be thrown into inoperative position. If the cents mechanism has not been operated, the dollars slide corresponding to the denomination of the dollars key which was depressed will be withdrawn, while if the cents mechanism has been operated, the various dollar cranks will have been shifted, so that when a dollars key is depressed, the dollar slide of the next higher denomination will be withdrawn. For instance, should an even three dollar purchase be made and the 3 dollar key depressed, the 3 dollar slide would be withdrawn. On the other hand, should a three dollar and twenty-five cent purchase have been made, the 25 cent key would first have been depressed and the dollar bell crank levers shifted, so that upon depression of the 3 dollar key, the 4 dollar slide would be withdrawn.

The basic dollar slides, or those of the 1 dollar, 2 dollar, 4 dollar, 5 dollar, and 10 dollar denominations, are as in the previous instance extended rearwardly beyond the other slides and provided with rollers or guide members 170 which are adapted to be engaged by the ejecting cams 171, 172 and 173, 174, and 175 on the dollars ejecting shaft 107. Arranged under the rear ends of the basic dollar slides, in a manner identical with that previously described in connection with the cents mechanism, are the ejection operating slides 176, 177, 178, 179 and 180, the said slides being mounted upon a suitable frame 181. Each of these ejection operating slides is provided with a latch 182 (see Fig. 4) which is identical in construction with the latches 86 of the cents mechanism, and is adapted to engage a shoulder 183 on the corresponding dollar slide. These latches, as in the cents mechanism, are provided with the side pieces 184 which project upwardly above the dollar slides and have the rollers 185 mounted thereon. A transverse shaft 186 extends across the rear ends of the dollar slides and is provided with three cams 187 which are arranged respectively over the 1 dollar, 2 dollar, and 4 dollar slides, and serve to normally hold the corresponding latches in an inoperative position. The said shaft 186 is also provided with a cam 188 which is arranged over the 5 dollar slide and normally holds the 5 dollar latch in an inoperative position, and also with a cam 189 which is arranged over the 10 dollar slide and normally holds the 10 dollar latch in an inoperative position. The cams 187, 188 and 189 are identical in construction with the latch controlling cams of the cents mechanism, the three cams 187 being all of the same length, and shorter than the 5 dollar cam 188, while the said 5 dollar cam is in turn shorter than the 10 dollar cam 189. These cams are normally all in operative position, with the latches 182 all depressed to admit of the dollar slides being moved independently of the ejection operating slides.

Figure 22:
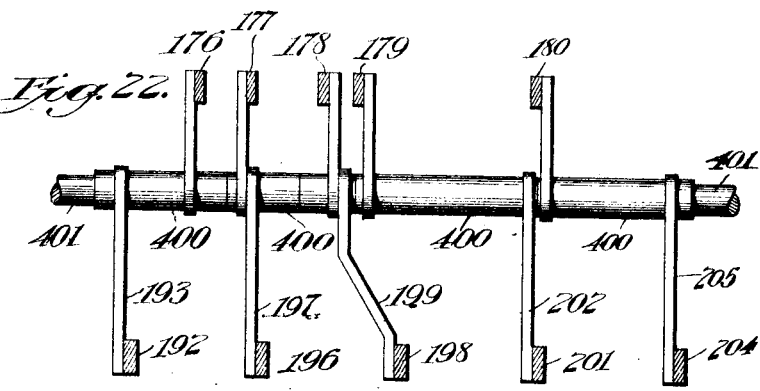
Figure 23:
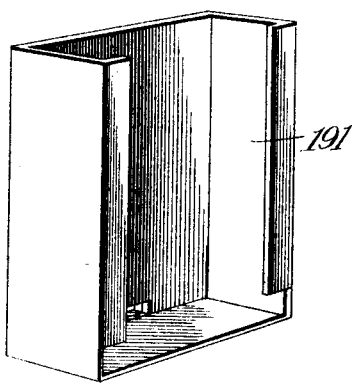
Figure 24:

The bills of paper money are designed to be folded and placed in metal blanks 190 similar to that shown by Fig. 24. A series of these blanks containing 1 dollar bills would be placed in a tube or chute 191, and an ejecting slide 192 at the base of this 1 dollar tube would be connected by a lever 193 to the ejection operating slide 176 which is located under the 1 dollar slide. In a similar manner a series of these blanks 190, each of which contains 2 dollars, would be placed in each of the 2 dollar guides 194 and 195. An ejecting slide 196 for the two 2 dollar guide 194 would be connected by a lever 197 to the ejection operating slide under the 2 dollar slide, while an ejecting slide 198 for the 2 dollar guide 195 would be connected by a lever 199 to the ejection controlling slide 178 under the 4 dollar slide. A series of 5 dollar bills, each of which is carried by a blank 190 would be placed in the 5 dollar guide 200, the ejecting slide 201 for the said guide being connected by a lever 202 to the ejection operating slide 179 which is located under the 5 dollar slide. In a similar manner, blanks containing 10 dollar bills would be placed in the 10 dollar guide 203, the ejecting slide 204 for the said guide being connected by a lever 205 to the ejection controlling slide 180 which is located under the 10 dollar slide. As shown by Fig. 22 the various levers 193, 197, 199, 202 and 205 are each formed with a sleeve 400, the said sleeves being loose upon the pivot shaft 401. It will thus be obvious that when any one of these ejection operating slides is reciprocated, one of the blanks 190 will be displaced and drop into the drawer 83, carrying paper money of the corresponding amount with it.

One end of the shaft 186 upon which the dollars latch controlling cams are mounted, (see Fig. 4) is provided with a gear wheel 206, which meshes with a segmental rack 207 rigid with the dollars lever 208, the said dollars lever projecting through a slot 209 in the top of the casing, and a suitable scale 210 being provided with graduations ranging from 0 to 20. As in the previous instance, the movement of this dollars lever 208 serves to rotate the shaft 188 and adjust the position of the latch releasing cams, the three latch releasing cams 186 being first released, then the 5 dollar cam 188, and finally the 10 dollar cam 189.

Should a one dollar purchase be made and five dollars tendered in payment, the operator would depress the 1 dollar key and thereby withdraw the 1 dollar slide. The dollars lever 208 would next be moved to the 5 dollar point upon the scale 210, thereby moving the three cams 187 into inoperative positions and releasing the latches 182 for the 1 dollar, 2 dollar, and 4 dollar slides. Upon operating the crank 105, so as to rotate the shaft 107 and operate the various ejecting cams for the dollars mechanism, all of the basic dollar slides will be moved forward, with the exception of the 1 dollar slide which was withdrawn by the depression of the 1 dollar key. The 5 dollar slide and 10 dollar slide will be moved forwardly independently of the corresponding ejection operating slides, since the latch members for these slides are still in an inoperative position, while the 2 dollar slide and 4 dollar slide will actuate the ejection operating slides 177, and 178 and force one of the blanks 190 from each of the 2 dollar guides 194 and 195. The necessary 4 dollars in change will thus be delivered.

Should three dollars be purchased and ten dollars tendered, the depression of the 3 dollar key would withdraw the 2 dollar slide and the 1 dollar slide. The movement of the dollar lever 208 to the 10 dollar point upon the scale 210 would move the three cams 187 and the 5 dollar cam 188 into inoperative position, although the 10 dollar cam 189 would still remain operative. Upon turning the main crank 105 and operating the ejecting cams, all of the basic dollar slides would be moved forward, with the exception of the 2 dollar slide and 1 dollar slide which were withdrawn by the depression of the 3 dollar key. The 10 dollar slide would be moved independently of the 10 dollar ejection operating slide, while the 5 dollar slide and 4 dollar slide would carry with them the ejection operating slides 178 and 179 respectively. One of the blanks 190 will thus be forced from each of the guides 200 and 195, one of the blanks containing a 5 dollar bill and the other blank a 2 dollar bill.

Should 7 dollars be purchased and 20 dollars tendered, the depression of the 7 dollar key would withdraw the 5 dollar slide and the 2 dollar slide. By moving the dollars lever 208 to the 20 dollar point upon the scale 210, all of the cams 187, 188 and 189 would be moved into inoperative positions, so as to release all of the latches 182. By manipulating the main crank 195 and thereby operating the various ejecting cams, all of the basic dollar slides would be moved forward, with the exception of the 5 dollar slide and 2 dollar slide which were withdrawn by depression of the 7 dollar key. The 1 dollar slide, 2 dollar slide, and 10 dollar slide, will actuate the ejection operating slides 176, 177 and 180, thereby delivering a blank from each of the guides 203, 194 and 191. These blanks would contain an aggregate of 13 dollars, the required amount of change.

Special provision is necessary for giving one dollar change under certain conditions, as when one dollar is purchased and two dollars is tendered and also when three dollars is purchased and four dollars is tendered. This special mechanism, (see Fig. 17) is very similar to that previously described in connection with the cents mechanism for giving 5 cents change when 5 cents is purchased and 10 cents tendered. The ejecting cam 171 for the dollar slide is carried by a sleeve 211 which has a feather and spline connection with the shaft 107. A bell crank shifting lever 212 is employed for moving the sleeve upon the shaft, a spring 213 which is connected to the shifting lever 212 normally tending to hold the cam opposite the roller 170 of the 1 dollar slide. The free arm of the shifting lever 212 is provided with a roller or guide member 214 adapted to be engaged by a special cam 215 upon the cam shaft 186. When this special cam 215 is in operative position and engages the roller 214 of the shifting lever, the sleeve 211 is moved longitudinally upon the shaft 107 so as to bring the 1 dollar ejecting cam 171 opposite a roller or guide member 216 upon an arm 217 which projects upwardly from the 1 dollar ejection controlling slide 176. This special cam 215 remains in engagement with the roller 214 while the dollars lever 208 is at the 2 dollar, 3 dollar, or 4 dollar indications upon the dollar scale 210. At all of these times the latch controlling cams 187, 188 and 189 are all in operative position, so as to hold all of the latches 182 depressed. However, as soon as the dollars lever 208 reaches the 5 dollar mark upon the scale 210, the special cam 215 moves out of engagement with the roller 214 so as to permit the shifting lever 212 to be swung back to normal position by the spring 213, and the three cams 187 over the 1 dollar slide, 2 dollar slide and 4 dollar slide, are simultaneously moved into inoperative position. Should a one dollar purchase be made and two dollars tendered, the depression of the 1 dollar key would withdraw the 1 dollar slide, and the bringing of the dollars lever 208 to the 2 dollar mark upon the scale 210 would throw the special cam 215 into operative position and bring the dollars ejecting cam 171 opposite the roller 216 of the arm 217. By operating the main crank 105 and actuating the ejecting cams, the cam 171 would force the ejection operating slide 176 forwardly so as to give one dollar in change, while the remaining basic dollar slides would be forced forwardly independently of the corresponding ejection operating slides. Should six dollars be purchased and seven dollars tendered, the only manner in which the seven dollars could be tendered without making even change would be by a five dollar bill and a two dollar bill. The operator must always move the lever to a point upon the scale corresponding to the smallest denomination tendered, and following this rule the operator would move the dollars lever to the 2 dollar point upon the scale and the proper change of one dollar would be given. Similarly, should seven dollars be purchased and eight dollars tendered, the only manner in which eight dollars could be tendered without making even change, would be by four two dollar bills, and the operator would move the dollars lever to the 2 dollar point upon the scale and obtain one dollar change.

Having fully considered purchases involving only cents or only dollars, we may now consider purchases involving both dollars and cents. Should a purchase of one dollar and twenty-five cents be made and five dollars tendered in payment, the operator would first depress the 25 cent key would withdraw the 25 cent slide and would also operate through the rod 126, link 125 and shifting lever 124 to slide the dollar bell crank shaft 208 longitudinally so that the depression of the 1 dollar key would withdraw the 2 dollar slide. The cents lever 98 would then be moved to the 100 or 1 dollar point so as to set the mechanism for the delivery of 75 cents or the proper change between 25 cents and one dollar. The dollar lever 208 would be moved to the 5 dollar point, so as to set the mechanism for the discharge of three dollars, or the difference between the 2 dollar slide which was withdrawn and five dollars, the amount tendered. Upon operating the main crank 105, the cents ejecting cams and dollars ejecting cams would be rotated so as to cause the ejection of seventy-five cents in coin and three dollars in paper money, the said three dollars and seventy-five cents being the proper change.

In order to facilitate setting of the dollar lever 208 and cents lever 98, when the purchase involves both dollars and cents, a suitable clutch 218 is provided, (see Fig. 14) the said clutch serving when moved into operative position to lock the cents lever with the dollar lever so that the two levers can be moved simultaneously. This clutch 218 is controlled by a bell crank shifting lever 219. The free arm of the shifting lever being connected to a plunger 220 which passes loosely through the handle of the dollars lever and terminates at the upper end thereof in a head or finger piece 221. A spring 222 normally forces the plunger 220 upwardly so as to hold the clutch 218 in an inoperative position. When a purchase involving dollars and cents is made, the operator grasps the handle of the dollars lever 208 and presses downwardly upon the finger piece 221 so as to operate the clutch and lock the cents lever with the dollars lever. The dollars lever is then drawn forwardly to the end of the slot 209 and pressure upon the finger piece 221 released so as to break the clutch connection between the two levers and leave the cents lever at the 100 mark upon the scale 100. The dollars lever can then be moved independently of the cents lever and is brought back to the proper position upon the dollars scale 210. This eliminates the necessity of actually handling both of the levers and thereby results in a saving of time and trouble when operating the machine.

Should the purchase be seven dollars and ten cents and ten dollars be tendered in payment therefor, the operator would first depress the 10 cent key and then the 7 dollar key. As previously explained, this would result in withdrawing the 10 cent slide and the 8 dollar slide. The cents lever 98 would then be set at the 100 point and the dollars lever 208 at the 10 dollar point. Upon operation of the main crank 105, the ejecting cams would then cause 90 cents in coin and 2 dollars in bills to be ejected from the machine. It will thus be obvious that the operation of the machine in which cents and dollars are combined is identical with that in which cents only or dollars only are involved, with the exception of the fact that the depression of the cents key operates to shift all of the dollar bell crank levers 117 so that the depression of any one of the dollars keys will withdraw the dollar slide of the next higher value. This prevents the machine from giving one dollar too much change, which would otherwise take place in such transactions.

A special mechanism is necessary for causing the proper change to be given when the purchase is less than one dollar, and two dollars or more is tendered in payment. Assume that the purchase is 25 cents and that five dollars is tendered in payment: Under these conditions, the operator would not depress any of the dollar keys, and consequently without some provision for such a case, the machine would discharge five dollars and seventy-five cents in change, or exactly one dollar too much. In order to overcome this difficulty, some mechanism such as that shown in Figs. 33 to 35 inclusive is necessary. A spring actuated plunger 223 is slidably mounted within a guide sleeve 224 at the end of a bracket 225, the said plunger being formed with a beveled nose 226 which is adapted to project into the path of the dollars lever 208. A coil spring 227 normally tends to force the plunger 223 in such a position that the beveled nose 226 thereof is not in the path of the dollars lever. An annular grooved rib 228 extends around the plunger 223 so as to be engaged by the beveled nose 229 of a detent 230 for the purpose of holding the plunger against the action of the spring 227. Owing to the beveled formation of the nose 229, however, the grooved rib can be readily forced out of engagement with the detent so as to release the plunger 223 when the dollars lever 208 is brought forcibly into engagement with the beveled nose 226 of the plunger. Some means is provided whereby this plunger is always set when one of the cents keys is operated. As shown upon the drawing, the plunger is provided with a pin 231 which projects through a slot 232 in the guide sleeve and coöperates with the ends of this slot to limit the sliding movement of the plunger. A finger 233 upon one of the arms of a bell crank lever 234 is adapted to engage this pin 231 for the purpose of moving the plunger into an operative position and causing the detent or pawl 230 to engage the grooved rib 228. The opposite arm of the bell crank 234 is connected by a link 235 to another bell crank 236 which is pivoted upon one of the sides of the casing. This bell crank 236 is in turn connected by a link 237 to the bell crank 238 which carries one end of the transverse rod 126. This transverse rod, as has been previously explained, extends under all of the cents bell cranks 8 so as to be forced downwardly when one of the cents keys is depressed. With the above mechanism, it will be obvious that the depression of one of the cents keys will operate through the various connections to swing the bell crank 234 and slide the plunger 223 against the action of the spring 227 into an operative position, the latch 230 serving to retain the plunger in this operative position. This plunger 223 is connected by a link 239 which extends transversely across the machine to an arm 240 upon the opposite side of the machine, the said arm being rigid with a shaft 241 which is provided with a second arm 242. This arm 242 is connected by a downwardly extending link 243 to the end of a lever 244 which is loose upon the shaft 245. This shaft is provided with an enlargement 246 formed with a cam shoulder 247 adapted to be engaged by a pawl 248 upon the lever 244. A finger 249 which is pendent from the shaft 245 and rigid therewith is adapted to engage a lug 250 upon the 1 dollar slide so as to force the said 1 dollar slide into an inoperative position when moved against the same.

With this construction, it will be obvious that when one of the cents keys is depressed the plunger 223 will be automatically set in an operative position, provided it was not already in such position. Should the dollars lever 208 be operated, the engagement thereof with the beveled nose 226 of the plunger 223 would serve to release the plunger and permit the same to be forced outwardly by the spring 227. This motion of the plunger being transmitted through the link 239, shaft 241 and link 243 to the lever 244 would rock the shaft 245 and cause the finger 249 to move the dollar slide into an inoperative position. One dollar would thus be deducted from the change which would otherwise be given, and instead of giving one dollar too much, the correct change would be given.

Where the purchase involves both dollars and cents, it is necessary to provide some suitable mechanism for preventing the plunger 223 from moving the 1 dollar slide into an inoperative position, since under many conditions it is necessary that a one dollar bill be ejected as a part of the change. In order to overcome this difficulty, a transverse rod 251 is provided which extends under all of the dollar bell cranks 117. One end of this rod 251 is mounted upon a swinging arm 252, while the opposite end thereof is carried by a bell crank 253, the said bell crank being connected by a link 254 to another bell crank 255; This bell crank 255 carries a releasing rod 256, the upper end of which is slotted at 257 to receive a pin 258 upon the pawl 248. With this mechanism, it will be obvious that upon the depression of any one of the dollar keys, the pawl 248 will be lifted into an inoperative position. The movement of the plunger 223 when it is released by the action of the dollars lever, will then operate as before to swing the lever 244 about the shaft 245, although the said shaft and finger 249 will not be moved, owing to the fact that the pawl 248 is held out of engagement with the shoulder 247. With this mechanism, when one of the cents keys is depressed without depressing one of the dollars keys and the dollars lever 208 is moved, the 1 dollar slide is always withdrawn so as to deduct 1 dollar from the change ejected by the dollars mechanism. On the other hand, when one of the dollars keys is also depressed, the 1 dollar slide is not withdrawn into inoperative position, since this is not necessary proper provision being made for preventing the ejection of the extra dollar by reason of the fact that after a cents key has been depressed, the depression of any one of the dollars keys serves to withdraw a dollars slide which has a greater value by one dollar than the value of the key which was depressed.

It should be mentioned at this point that one of the rules to be followed in operating the machine is not to manipulate either the cents lever 98 or the dollars lever 208 when the exact amount is tendered for the purchase, since under these conditions no change would be necessary. Also, when the change to be given would be less than one dollar, the dollars lever 208 should not be manipulated, since there are no dollars to be given in change. For instance, should the purchase be six dollars and twenty-five cents and seven dollars tendered in payment therefor, the cents lever would be moved to the 100 point upon the scale 100, while the dollars lever 208 would not be moved and would remain at the zero point on the scale 210. Upon operating the main crank 105, the correct change, namely, seventy-five cents, would be ejected. There are thus three rules to be followed in operating the machine: first, not to move either the cents lever 98 or the dollars lever 208 when the exact amount is tendered for the purchase; second, not to move the dollars lever 208 when there are no dollars to be given in change; and third, to move the cents lever and dollars lever to points upon the respective scales corresponding to the smallest money denominations which are tendered in payment, as has been previously explained.

It is of course necessary to provide some mechanism for resetting the machine and bringing all of the parts back to normal position after each operation of the machine. (See Figs. 4 and 25.) Resetting frames 259 and 260 are provided for the cents slides 11 and dollars slides 120 respectively, the said resetting frames being mounted upon the same guide members as the slides. The frame 259 is formed with a transverse bar which extends across the ends of all the cents slides 11 at the forward end of the machine, the said bar being shown as provided with a screw 261 for each of the slides, the ends of the screws forming stops or abutments to engage the slides. In a similar manner the resetting frame 260 of the dollars mechanism is formed with a transverse bar provided with a screw 262 for each of the dollar slides. It will be obvious that by moving these resetting slides inwardly and then outwardly, any of the dollars slides or cents slides which may have been previously withdrawn, will be moved back to their original position. An arm 263 is pendent from the cents resetting slide 259, the said arm being connected by a link 264 to an arm 265 upon a shaft 266, the said shaft being provided with resetting fingers 267 for the various ejection operating slides of the cents mechanism. In a similar manner, the resetting slide 260 of the dollars mechanism is provided with a pendent arm 268 which is connected by a link 269 to an arm 270 upon a shaft 271, said shaft being provided with resetting fingers 272 for the ejection operating slides of the dollars mechanism. It will thus be obvious that the ejection operating slides will be reset or moved back to their original position at the same time that the dollars slides and cents slides are reset or moved back to their original position. A transverse shaft 273 is arranged intermediate of the dollars mechanism and cents mechanism, (see Fig. 4) said shaft being provided with the upwardly extending levers 274 and the downwardly extending levers 274 loosely engage opposite sides of the cents resetting frame 259, while the downwardly extending levers 275 loosely engage opposite sides of the dollars resetting frame 260. These upwardly and downwardly extending levers 274 and 275 upon one side of the machine are connected by the rearwardly extending and converging links 276 to a resetting bell crank lever 277, the free arm of the resetting bell crank lever being provided with a roller 278 which is arranged in the path of a resetting cam 279 upon the ejecting cam shaft 107 of the dollars mechanism. This resetting cam 279 is, however, arranged at an angle to the ejecting cams and does not come into operative position until after the ejecting cams have completed their action and been moved into an inoperative position. It will thus be obvious that a continued rotary movement of the main operating crank 105 after operating the ejecting mechanism, as has been previously described, brings the resetting cam 279 into engagement with the roller 278 of the resetting bell crank lever 277 so as to operate both of the resetting slides 259 and 260. As soon as the resetting cam 279 is moved away from the roller 278, the resetting mechanism is again moved back to its original position by means of a spring 280 which connects the shaft 273 to the upper end of the resetting bell crank 277. The resetting frames and resetting fingers are thus moved away from the various slides so as not to interfere with the proper movement of the slides in the operation of the machine.

For the purpose of moving the dollar lever 208 and cents lever 98 back to zero position, a resetting lever 281, shown in detail by Figs. 15 and 16, is provided, the swinging end of the said resetting lever being provided with a pair of rollers or guide members 282 adapted to engage the respective levers. The pivot end of this resetting lever 281 is rigid with a shaft 283 which extends through the side of the casing 1 and has a gear wheel 284 on the outer end thereof. This gear wheel is engaged by a segmental rack 285 upon one of the arms of a bell crank 286, the opposite arm of the bell crank being provided with a roller 287 which is arranged in the path of a cam 288 which rotates with the gear wheel 103. This resetting cam 288 is brought into engagement with the roller 287 at substantially the same time that the resetting cam 279 engages the roller 278 of the resetting bell crank 277. The movement of the bell crank 286 which is caused by this cam 288 operates through the rack 285 and gear 284 to move the resetting lever 281 and bring both the cents lever 98 and the dollars lever 208 back to zero position. As soon as the cam 288 has swung out of engagement with the roller 287, the spring 289 serves to swing the bell crank 286 back to its original position and thereby move the resetting lever 281 away from the cents lever and dollars lever so as not to interfere with the movement thereof in the operation of the machine.

The invention also provides for operating a suitable mechanism whereby the amount of the purchase is indicated by the bringing of proper numerals opposite the view opening 4 at the top of the casing 1. (See Figs. 27, 31 and 32). A series of drums 290, 291, 292 and 293 are mounted upon a transverse shaft 294 so as to rotate independently of each other, the said drums being provided with numerals which are adapted to be brought opposite the sight opening 4 at the top of the casing so as to be visible through the same. The drum 290 is the unit drum for the cents and merely carries the two characters 0 and 5, since all purchases must be either 5 cents or a multiple thereof. The drum 291 is the tens drum for the cents and is provided with the characters 0, 1, 2, 3, 4, 5, 6, 7, 8 and 9. The drum 292 being the unit drum for the dollars is provided with characters similar to the drum 291, namely, 0 to 9 inclusive. The drum 293 is the tens drum for the dollars and is merely provided with the characters 0, 1 and 2, since the limit of the present machine is 20 dollars. Each of these drums is provided with a shaft 294 which brings a pinion 295 meshing with a gear 295', the said gears engaging racks upon the corresponding slides 296, 297, 298 and 299. These slides are normally held in a retracted position by means of the springs 300 which are connected to the rear ends thereof, and the various registering drums then all display the 0 mark through the sight opening 4. The rotary movement of the drums may be limited in any suitable manner, although in the present instance the drums are shown as formed with segmental slots 301 which receive the pins 302, the engagement of the pins with the opposite ends of the slots serving to prevent a too great rotary movement of the drums. The operating slides 296, 297, 298 and 299 all extend forwardly into the casing and are suitably mounted upon the guide frame 303. The forward end of the slide 296 is formed with a rack 304, which engages a pinion 305 upon a transverse shaft 306, the said shaft only extending partially across the machine and being journaled in a bracket 307 which projects from the guide frame 303, and a bearing 309 at the opposite side of the machine. The end of the shaft is provided with a downwardly extending arm 310, the extremity of which is connected by a forwardly extending link 311 to an upwardly extending arm 312 on a transverse shaft 313 which extends across the machine in front of the upright arms of the cents bell cranks 8. (See Figs. 18 and 19.) This shaft 313 is provided with fingers 314 arranged in front of each of the bell cranks corresponding to a number which should register 5 upon the cents unit drum. It will be obvious that one of these fingers 314 would be provided for every other cents bell crank 8, namely the 5 cent bell crank, 15 cent bell crank, 25 cent bell crank, and so on. These fingers 314 may be of any suitable construction, although in the present instance they are shown as provided with the set screws 314ª adapted for contact with the cents bell cranks 8 when they are operated. It will thus be obvious that the movement of any one of these bell cranks will serve to rock the shaft 313, and thereby rotate the shaft 306 and move the gear wheel 305 to withdraw the slide 296. The various parts are so arranged that the forward movement of the slide 296 is just sufficient to rotate the drum 210 and bring the character 5 thereon opposite the view opening 4. The slide is held in this position by means of a pawl 315 which is loose upon a short transverse shaft 316, the said pawl serving to engage suitable teeth 317 upon the slide.

The tens drum 293 for the dollars is operated in a manner very similar to that of the cents unit drum. The slide 299 which controls the movement of this drum, is provided at the forward end thereof with a rack 318 which is engaged by a gear wheel 319 upon a short transverse shaft 320, one end of which extends through the side of the casing 1 where it is provided with an arm 321 connected by a link 322 to a bell crank 323, the said bell crank being also connected by a link 324 to an arm 325 upon a shaft 326 which extends across the upright arms of the dollar bell cranks 117. (See Fig. 19.) This shaft 326 is provided opposite the bell cranks for from 10 dollars to 19 dollars inclusive with the downwardly extending fingers 327, and also opposite the 20 dollar bell crank with a finger 328. The fingers 327 and 328 may be of any suitable construction, and are shown in the present instance as provided with the set screws 327ª and 328ª, respectively, which are adapted for contact with the dollar bell cranks 117, the set screw 328ª projecting in advance of the set screws 327ª. This results in imparting a greater rotation to the shaft 327 upon the operation of the 20 dollar bell crank lever than is incident to the operation of the other bell crank levers.

The operation of any of the bell crank levers from 1 dollar to 9 dollars does not rotate the shaft 326, and consequently does not move the tens drum 293 for the dollars, but permits the same to remain at 0 position. When one of the dollar bell cranks from 10 dollars to 19 dollars inclusive is operated, the shaft 326 is rotated, the said rotation being imparted to the shaft 320 and gear 319 so as to withdraw the slide 299 and rotate the drum 293 to bring the character 1 opposite the view opening 4. Should the 20 dollar bell crank be operated, the shaft 326 would be rotated a greater amount, since the set screw 328$^a$ of the 20 dollar finger 328 upon the shaft 326 projects in advance of the other set screws 327$^a$. This greater rotary movement of the shaft 326 produces in turn a greater rotary movement of the shaft 320 and gear 319, and turns the drum 293 to bring the character 2 thereon opposite the view opening 4. A pawl 329 which is similar to the pawl 315 and is also loosely mounted upon the shaft 316 serves to engage teeth 330 upon the slide 299 so as to hold the same against the action of the spring 300. It will thus be obvious that when a purchase of from ten dollars to nineteen dollars is made, the depression of the corresponding dollars key will operate automatically to turn the drum 293 and bring the numeral 1 thereon opposite the view opening, and that when a purchase of twenty dollars is made, the depression of the 20 dollar key will operate automatically to produce a further rotation of the drum 293 and bring the numeral 2 thereon opposite the view opening.

The operating slide 297 of the tens drum for the cents is provided at the forward end thereof with a set of upwardly facing teeth 341 and also with a set of ten downwardly facing teeth 342. These downwardly facing teeth 342 are adapted to be engaged by a latch member 343 on a gear actuated slide 344. A spring 345 normally holds the latch 343 in a yielding engagement with the teeth 342 of the drum actuating slide 297. The forward end of the gear actuated slide 344 is provided with a rack 331 which meshes with a gear 332 upon a shaft 333 which extends longitudinally across all of the cents slides, one end of the shaft projecting beyond the side of the casing 1 where it is provided with a gear wheel 334. A register operating slide 335 is mounted directly over each of the cents slides 11, the said register operating slides being shorter than the cents slides, and being mounted upon a suitable guide 336. The shaft 333 is provided with a gear 337 directly over each of the register operating slides 336. The bottom of each of the said slides is provided with shoulders 338 which engage the guide frame 336 to limit the back and forth sliding movement thereof, while the top of each of the register operating slides is provided with teeth 339 adapted to engage the corresponding gears 337 of the shaft 333. The forward ends of the slides 335 have an operative connection with the upper ends of the corresponding cents bell crank levers 8, by means of the lateral lugs or pins 340 which project from the slides on opposite sides of the bell cranks. It will thus be obvious that when any one of the cents keys is depressed and one of the cents slides 11 withdrawn, the register operating slide 335 located directly over the cents slide will be simultaneously withdrawn. The teeth 339 upon this slide will engage the teeth of the gear 337 to rotate the shaft 333. The teeth 339 upon the various register operating slides 335 are arranged differently, so that a different amount of rotation is imparted to the shaft 333 according to the key which has been depressed. The 20 and 25 cent slides would both rotate the shaft 333 the same amount, although this rotation of the said shaft 333 would be greater than for the 10 or 15 cent slide, and slightly less than for the 30 or 35 cent slide. In a similar manner, the 40 and 45 cent slides would both produce the same rotation of the shaft 33, although this rotation would be greater than for the 30 or 35 cent slides, and less than the rotation produced by the 50 or 55 cent slides. This same relative relation exists between the rotation produced by all of the slides, and the fact that the rotation produced by the 30 cent slide and 35 cent slide is the same, is due to the fact that this mechanism merely controls the tens drum or disk 291, and for either of these purchases it would be necessary to display the numeral 3, the display of the character 5 by the unit drum being taken care of by the independent mechanism previously described. This same reasoning applies to the 40 and 45 cent slides, and 55 cent slides and so on.

As previously mentioned, there are ten teeth 342 upon the lower face of the drum actuating slide 297, (see Fig. 27) and the parts are so arranged that the outward movement of the slide through a distance corresponding to one of the teeth 342 tends to rotate the drum 291 a sufficient amount to bring the next character thereon opposite the view opening 4. The drum is normally at the zero position, and should the slide 297 be pulled outwardly a distance of one tooth, the numeral 1 would appear under the view opening, while should the slide be pulled outwardly a distance corresponding to five teeth, the numeral 5 would appear opposite the view opening, and so on. When the gear actuated slide 344 is moved rearwardly by the rotation of the shaft 333 and the action of the various gears thereon, the spring actuated latch 342 slips freely over the teeth 342 on the drum actuating slide 297. The various racks 339 upon the register actuating slides 335 are so proportioned, as has been previously described, that the amount of rotation imparted to the shaft 333 varies for the different slides. The rearward movement of the gear actuated slide 344 varies proportionately, and the various parts bear such a relation to each other that when the 10 or 15 cent key is depressed, the slide 344 is moved rearwardly through a distance corresponding to one of the teeth 342, while when the 20 or 25 cent keys are depressed the slide 344 is moved rearwardly a dis.nce corresponding to two of the teeth 343, and so on, the number of teeth representing the distance through which the slide 344 is moved corresponding exactly to the numeral upon the drum 291 which it is desired to bring under the view opening 4.

It must be borne in mind that the gear wheel 334 at the end of the casing 1 is also rigid with the shaft 333 so as to rotate therewith, the amount of rotation of this gear wheel also depending upon the key which is depressed. (See Fig. 3.) A segmental rack 346 which is carried by an arm 347 meshes with the gear 334, the said arm being pivoted to the casing at 348 and being connected by a link 349 to one arm of a bell crank lever 350, the opposite arm of the bell crank lever being provided with a roller 351 which is normally in such a position as to be just barely cleared by a cam 352 upon the shaft 19 which carries the ejecting cams of the cents mechanism. However, when the gear 334 is rotated by the depression of one of the cents keys, the movement of the rack 346 and arm 347 tends to swing the bell crank 350 and move the roller 351 thereon into the path of the cam 352, the amount of movement of the bell crank depending upon the amount of rotation of the gear 334 and varying, as will be understood, with the different cents keys.

Upon the depression of one of the cents keys, it will be understood that the gear actuated slide 344 will be moved inwardly and the gear 344 turned so as to swing the bell crank lever 350 and bring the roller 351 into the path of the cam 352. Should the 50 or 55 cent key 2 have been depressed, the latch 343 will have been moved inwardly a distance corresponding to five of the teeth 342, and the movement of the roller 351 will have been moved a proportionate amount. When the operator now turns the main crank 105, the cam 352 will engage the roller 351 and swing the bell crank lever 350 back to its original position. This will operate through the various gears, as will be readily understood, to pull the gear actuated slide 344 back to its original position, and the drum operating slide 297 will be pulled forwardly with the slide 344, owing to the fact that the latch 343 will engage the teeth 342. With the present example, the forward movement of the slide 297 would have been through a distance corresponding to five of the teeth 342, and the drum 291 would be rotated to bring the numeral 5 under the sight opening 4. In the event the 50 cent key had been depressed, the other drums would all remain at zero position, while should the 55 cent key have been depressed, the independent mechanism previously described would have served to move the cents unit drum to bring the numeral 5 also opposite the view opening. It will thus be obvious that the depression of the various cents keys serves to move the gear actuated slide 344 inwardly and to move the bell crank lever 350 to bring the roller 351 into the path of the cam 352, the degree of movement depending upon the value of the key which has been depressed. When the main crank 105 is operated, the gear actuated slide 344 is brought back to normal position and carries with it the drum actuating slide 297, the necessary amount of movement being imparted to the drum 291 to bring the necessary character thereon under the view opening.

The unit drum for the dollars is operated by a mechanism very similar to that employed for operating the tens drum for the cents. The drum actuating slide 298 for this drum is provided at the top thereof with the teeth 353, and at the bottom thereof with the ten teeth 354 which correspond to the before mentioned teeth 343. A gear actuated slide 355 is mounted under the forward end of the slide 298, and is provided with a spring latch 356 adapted to engage the teeth 354. The forward end of the gear actuated slide 355 is provided with a rack 357 adapted to be engaged by a gear 358 on a shaft 359. This shaft 359 has an operative connection with a transverse shaft 360 which extends across all of the slides 120 of the dollar mechanism. Any suitable means may be provided for causing the shafts 359 and 360 to rotate simultaneously and corresponding amounts, and in the present instance this result is accomplished by means of a chain 361 which passes around an idler 362 and has one end thereof secured to a sprocket 363 upon the shaft 359, while the opposite end thereof is secured to a sprocket 364 upon the shaft 360. This shaft 360 is provided with a series of gears 365 which are arranged over register actuating slides 366 which correspond with the register actuating slides 335 of the cents mechanism. These registering actuating slides 366 are provided with the teeth 367 which are adapted to engage corresponding gears 365 to produce rotation of the shaft 360. As in the previous instance, these register actuating slides 366 are provided at the forward ends thereof with the laterally projecting pins or lugs 368 which engage the dollar bell cranks 117 so that the depression of one of the dollar keys and consequent operation of the corresponding bell crank serves to withdraw the register operating slide as well as the corresponding dollar slide 120. It will be obvious, however, that even though the dollar bell cranks 117 be bodily shifted so that each bell crank is in engagement with the next higher dollar slide, the pins 368 are sufficiently long to maintain the bell crank levers in engagement with the same register operating slide 366. It will thus be apparent that should the purchase be, say three dollars and twenty-five cents, the depression of the 3 dollar key, which occurs subsequent to the depression of the 25 cent key, would serve to withdraw the 4 dollar slide 120 and the register operating slide 366 which corresponds to and is over the 3 dollar slide 120. As in the previous instance, the racks or teeth 367 upon the various register operating slides 366 are so proportioned as to produce different degrees of rotation of the shaft 360. The rotation of the shaft 360 is imparted through the medium of the chain 361 and coöperating sprockets to the shaft 359, and the rotation of this shaft 359 moves the gear actuated slide 355 inwardly or toward the back of the machine. The spring latch 356 then slips over the teeth 354, the inward movement of the slide 355 causing the latch 356 to ride over a number of the teeth 354 corresponding exactly to the numeral upon the drum 292 to be brought opposite the sight opening 4. One end of the shaft 359 projects beyond the end of the casing 1 where it is provided with a gear wheel 369 which meshes with a segmental rack 370 at the upper end of an arm 371 which is pivoted to the casing at 372. (See Fig. 3). This arm 371 is connected by a link 373 with a bell crank 374 which is provided with a roller 375. This roller 375 is normally in such a position as to be just barely cleared by the cam 352, although the rotation of the shaft 359 when one of the dollars keys is depressed, operates to move the bell crank 374 to throw the roller 375 into the path of the cam 352. When the cam 352 is now turned, upon the operation of the main crank 105, the bell crank 374 is moved back to its original position and the shaft 359 simultaneously rotated to withdraw the gear actuated slide 355 and bring the same back to its original position. Owing to the action of the latch 256, the drum actuating slide 298 is withdrawn with the slide 355, and the drum 292 thereby rotated to bring the proper numeral under the view opening. This mechanism automatically operates the unit drum of the dollars to bring the proper numeral in position, the tens drum of the dollars being controlled by the independent mechanism which has been previously described. It will be obvious that these four independent mechanisms will operate to rotate the four registering drums so as to show the exact amount of the purchase.

It is of course necessary to provide some mechanism for resetting the various drum operating slides. (See Figs. 3, 27 and 29.) The teeth 341 at the top of the slide 397 for the tens drum of the cents are engaged by a pawl 375 to hold the slide against the action of the spring 300, and in a similar manner, the teeth 353 at the top of the slide 298 for the unit drum of the dollars are engaged by a pawl 376 to hold the slide against the action of the spring 300. These two pawls 375 and 376 are rigid with the shaft 317 upon which the two pawls 315 and 329 are loose. One end of this shaft 316 extends through an end of the casing 1 where it is provided with an arm 377, the said arm being connected by a link 374 to a bell crank 379, the said bell crank being provided with a roller 380, which normally projects in the path of the cam 352. A spring 381 engages the arm 377 and normally rotates the shaft 316 to hold the pawls 375 and 376 in a yielding engagement with the respective sets of teeth 341 and 353. The two other pawls 315 and 329 are loose upon the shaft 316 and may normally drop by gravity into operative position. The initial movement of the cam 352, however, brings the same into engagement with the roller 380 and swings the bell crank 379 so as to rotate the shaft 316 against the action of the spring 381 and lift the two pawls 375 and 376 into inoperative position. These pawls are both provided with rearward extensions, as shown more clearly in Fig. 27, the said rearward extensions being provided with pins 382 which operate in transverse slots 383 formed in vertically movable latch depressing plates 384. These plates 384 are slotted at 385 to receive the shaft 316 and the rear edges of the plates slide freely against the vertical wall 386. The lower edges of the plates 384 extend entirely across the ten teeth at the bottom of the corresponding drum actuating slides and are adapted to engage the corresponding detents upon the gear actuated slides. When the shaft 316 has been rotated as previously described to lift the pawls 375 and 376 into inoperative position, it will be obvious that the downward movement of the rearwardly extending ends of the pawls will serve to move the latch releasing plates 384 downwardly so as to force the latches 343 and 356 into inoperative position. The springs 300 will then draw the drum actuating slides 297 and 298 rearwardly to zero position. It will also be observed that the pawls 315 and 329 are formed with shoulders 387 which are adapted to be engaged by corresponding shoulders 388 upon the shaft 316, whereby both of the said pawls are also lifted into an inoperative position when the shaft 316 is rotated by the action of the cam 352. The springs 300 will then draw the drum actuating slides 296 and 299 back to zero position, unless they are held against the action of the springs by reason of the fact that certain keys have been depressed which hold them in the proper position for registering the amount of the purchase after the other drums have been moved by the respective mechanisms controlling the same. Since the cam 352 always engages the roller 370 and is moved entirely out of engagement with the same before engaging the roller 351, it will be obvious that all of the detents or pawls of the drum actuating slides will be elevated into an inoperative position and then permitted to drop back to an operative position, before the gear actuated slides are drawn outwardly to set the drum 291 and 292. The release of the pawls will permit the drums 290 and 293 to return to zero position, unless keys have been depressed which demand that the said drums assume other positions. In the latter instance the drums will remain in proper position when the pawls are released, notwithstanding the action of the springs 300, owing to the fact that the main keys still remain depressed.

Should a twelve dollar and ninety-five cent purchase be made, the depression of the 95 cent key would operate through the various gears to push inwardly the gear controlled slide 344 through a distance corresponding to nine of the teeth 342. The 95 cent bell crank 8 would engage one of the fingers 314 upon the shaft 313 and by rocking this shaft 313 withdraw the drum operating slide 296 so as to rotate the unit drum of the cents and cause the same to show the character 5 through the sight opening. The depression of the 12 dollar key 3 would withdraw the register actuating slide 335 over the 12 dollar slide and operate through the various gears to move the gear operating slide 355 inwardly through a distance corresponding to two of the teeth 354. The movement of the 12 dollar bell crank 117 would also engage one of the fingers 327 and rotate the rock shaft 326 so as to withdraw the drum actuating slide 299 and cause the tens drum 293 of the dollars device to show the character 1 through the view opening. Upon actuating the main crank 105 to operate the ejecting mechanism, the cam 352 will first engage the roller 380 of the bell crank 379 and release all of the pawls upon the shaft 316. The drum actuating slides 297 and 298 will be drawn back to zero position by the springs 300, although the slide 296 of the cents unit drum will remain withdrawn by reason of the fact that the 95 cent key is still depressed, and the slide 299 of the tens drum for the dollars will also remain withdrawn, owing to the fact that the 12 dollar key is still depressed. The cam 352 then moves out of engagement with the roller 380 so as to permit all of the pawls to fall back into operative position, and then engages the two rollers 375 and 351 of the bell cranks 374 and 350 respectively. These bell cranks are thus moved back to their original position and this results, as has been previously described, in withdrawing the two gear actuating slides 344 and 355. The gear actuated slide 344 upon being withdrawn carries with it the drum actuating slide 297 and causes the drum 291 to show the numeral 9 through the view opening. In a similar manner, the gear actuating slide 355 upon its return to normal position carries with it the drum operating slide 298 and rotates the drum 292 to bring the character 2 opposite the view opening. The various drums of the registering mechanism have thus been automatically set to show twelve dollars and ninety-five cents, which is the amount of the purchase. It will be obvious that in a similar manner the exact amount of any purchase will be automatically registered by the depression of the keys and the subsequent operation of the machine.

It is also contemplated to provide a mechanism which will add up the various purchases and indicate the total amount of the sales. This totalizer may be of any desired construction, and since the details thereof constitute no part of the present invention, it will only be described in a very general manner. A series of drums 389, 390, 391 and 392 which correspond to the various drums of the indicating mechanism are mounted upon a shaft 393 which is arranged parallel to and adjacent to the shaft 294. These drums of the totalizer are each provided with a ratchet 394 which is engaged by a pawl 395 upon a gear wheel 396 which meshes with a gear 397 upon the corresponding drum of the registering device. Upon the forward movement of the registering drums, the pawls 395 engage the racks 394 so as to produce a corresponding rotary movement of the totalizing drums, although upon the return of the registering drums to zero, the pawls 395 slip freely over the racks 394. It will thus be obvious that the various drums of the totalizer are moved forwardly with the registering drums, although they remain stationary when the registering drums are returned to zero positions. Housings 398 are arranged between the various drums of the totalizer, and any suitable carrying mechanism may be arranged within these housings. The exact manner of constructing this totalizer is not essential, although it would be very desirable to provide some means in connection with a machine of this character for automatically adding up the different sales and indicating the total amount of all of the sales. In the present instance the various drums of the totalizer are shown as provided with characters which are adapted to be brought opposite the view opening 399, thereby enabling the proprietor or operator to determine at a glance the total amount of all sales since the mechanism had last been to a zero position.

I claim:

1. A machine of the character described, including a series of main slides of different cash values, a series of cash ejecting devices of corresponding cash values, a latch for temporarily coupling each main slide to its corresponding cash ejecting device, means for causing each latch to be independently engaged and disengaged, selective means actuated according to the amount tendered for controlling the latch, selective means for rendering inoperative main slides of an aggregate cash value corresponding to the amount of the purchase, and means for operating all the main slides.

2. A machine of the character described, including a series of main slides of different cash values, a series of cash ejecting devices of corresponding cash values, latch means for locking the respective main slides with the corresponding cash ejecting devices, a series of cams controlling the respective latch means, selective means actuated according to the amount tendered for bringing the cams successively into operation, selective means for rendering inoperative main slides having an aggregate cash value equivalent to the amount of the purchase, and means for simultaneously operating all of the main slides which were not rendered inoperative.

3. A machine of the character described, including a series of main slides of different cash values, a series of cash ejecting devices of different cash values, latch means for locking the respective main slides with the corresponding cash ejecting devices, a cam shaft extending transversely across the main slides, a series of cams upon the cam shaft, said cams being arranged to throw the various latch means successively into action according to the amount of rotation of the cam shaft, means for moving the cam shaft an amount corresponding to the amount tendered, selective means for rendering inoperative main slides of an aggregate value equivalent to the amount of the purchase, and means for operating all of the main slides not rendered inoperative.

4. A machine of the character described, including a series of main slides of different cash values and including a number of basic slides corresponding to the primary cash values, an independent ejection controlling slide for each of the primary cash value slides, cash ejecting devices operatively connected with the ejection controlling slides, latch means for locking the primary cash value slides with the respective ejection controlling slides, selective means actuated according to the amount tendered for controlling the latch means, selective means actuated according to the amount of the purchase for rendering inoperative a corresponding main slide, means for simultaneously rendering inoperative primary cash value slides of an aggregate value corresponding to the value of the said main slide, and means for operating those of the primary cash value slides not previously rendered inoperative.

5. A machine of the character described, including a series of main slides of different numerical values, and among which are basic slides corresponding to the primary cash values, an independent ejection controlling slide for each of the primary cash value slides, cash ejecting devices operatively connected with the respective ejection controlling slides, latch means for locking the primary cash value slides with the respective ejection controlling slides, a series of cams for the latch means, selective means adapted to be actuated according to the amount tendered for moving the cams to successively render the various latch means operative, selective means actuated according to the amount of the purchase for moving into inoperative position the main slide of a corresponding cash value, means for simultaneously rendering inoperative primary cash value slides of an aggregate value corresponding to the value of the said main slide, and means for operating those of the primary cash value slides not previously rendered inoperative.

6. A machine of the character described, including a series of main slides of different cash values and among which are basic slides corresponding to the primary cash values, an independent ejection controlling slide for each of the primary cash value slides, cash ejecting devices operatively connected with the respective ejection controlling slides, independent latch means for locking the several primary cash value slides with the respective ejection controlled slides, a cam shaft, a series of independent cams upon the cam shaft, said cams controlling the latch means and being arranged to successively render the latch means operative as the cam shaft is rotated, means for rotating the shaft an amount corresponding to the amount tendered, selective means actuated according to the amount of the purchase for moving the main slide of a corresponding value into inoperative position, means for simultaneously rendering inoperative primary cash value slides of an aggregate value corresponding to the value of the said main slide, and means for operating those of the primary cash value slides not previously rendered inoperative.

7. A machine of the character described, including a series of main slides of different cash values and among which are basic slides corresponding to the primary cash-values, an independent ejection controlling slide for each of the primary cash value slides, cash ejecting devices operatively connected with the respective ejection controlling slides, a latch carried by each of the ejection controlling slides and adapted to engage the corresponding primary cash value slide to lock the slides together, yielding means tending to hold the latches in operative position, a series of cams normally holding the latches in inoperative position and adapted to successively release the latches, selective means adapted to be actuated according to the amount tendered to control the cams, selective means actuated according to the amount of the purchase for moving the main slide of a corresponding value into inoperative position, means for simultaneously rendering inoperative primary cash value slides of an aggregate value corresponding to the value of the said main slide, and means for operating those of the primary cash value slides not previously rendered inoperative.

8. A machine of the character described, including a series of main slides of different cash values, a series of cash ejecting devices of different cash values, latch means for locking the main slides with cash ejecting devices of a corresponding value, a cam shaft, a series of cams upon the cam shaft, said cams cooperating with the beforementioned latch means to throw the same successively into action as the shaft is rotated, a lever adapted to be moved according to the amount tendered, gearing between the lever and the cam shaft, selective means actuated according to the amount of the purchase for rendering inoperative a corresponding main slide, and means for operating those of the main slides not rendered inoperative.

9. A machine of the character described, including a series of main slides of different cash values and among which are basic slides corresponding to the primary cash values, an independent ejection controlling slide for each of the primary cash value slides, cash ejecting devices operatively connected with the respective ejection controlling slides, independent latch means for locking the several ejection controlling slides with the corresponding primary cash value slides, a cam shaft, a series of independent cams upon the cam shaft, said cams controlling the latch means and being of different lengths so as to successively render the various latch means operative as the shaft is rotated, a pinion upon the shaft, a gear meshing with the pinion, a lever connected to the gear and adapted to be moved according to the amount tendered, selective means for rendering inoperative primary cash value slides of an aggregate value equivalent to the amount of the purchase, and means for operating those of the primary cash value slides not previously rendered inoperative.

10. A machine of the character described, including cash ejecting means, a series of slides of different numerical values, a dollars keyboard, a cents keyboard, each of said keyboards operatively connected with said slides and adapted to be actuated according to the amount of the purchase, a dollars lever and a cents lever adapted to be moved independently to the amount tendered in their respective cash limits or simultaneously when the amount tendered involves both dollars and cents, and means cooperating with the slides and controlled by the movement of the levers for setting the cash ejecting means to discharge the difference between the purchase and amount tendered.

11. A machine of the character described including a series of independent cash ejecting devices for the primary cash values, a series of main slides of different cash values, normally inoperative latch means between the said main slides and the cash ejecting devices of corresponding values, selective means for moving slides representing an aggregate cash value equal to the amount of the purchase so as to prevent the latch means for the said slides from becoming effective even when moved into operative position, selective means for moving into operative position the latches upon cash ejecting devices having an aggregate value equivalent to the amount tendered and including the latch means of the slides which were previously moved to prevent the latch means from becoming effective with respect thereto, and means for operating the slides so as to actuate the cash ejecting devices of which the latches were moved into operative position with the exception of those corresponding to the slides which were previously moved, the said previously moved slides serving to deduct the amount of the purchase so that the correct change is given.

12. A machine of the character described including a series of main slides of different numerical values and including a number of basic slides corresponding to the primary cash values, the larger values being built up by different combinations of the said primary values, independent cash ejecting devices for the primary cash values, means for moving any selected one of the main slides, means whereby basic slides of an aggregate value equal to the value of any main slide are moved into inoperative position when the main slide is moved, means for producing an operative connection between the different cash ejecting means and those basic slides of corresponding value provided the said basic slides have not been already moved, and means for moving all of the basic slides which have not been moved so as to operate the coin ejecting devices corresponding in value thereto.

13. A machine of the character described including a series of main slides of different numerical values, and among which are basic slides corresponding to the primary cash values, the larger values being built up by different combinations of the said primary values, independent cash ejecting devices for the primary cash values, means for moving any selected one of the main slides, means whereby basic slides of an aggregate value equal to the value of any main slide are moved into inoperative position when the main slide is moved, normally inoperative locking means between the different cash ejecting devices and the basic slides of corresponding value, selective means for throwing the said locking means into operative position although the locking means remain ineffective with regard to those of the basic slides which were previously moved, and means for moving all of the basic slides which have not been previously moved so as to operate the corresponding cash ejecting devices.

14. A machine of the character described including a series of main slides of different numerical values and among which are a number of basic slides corresponding to the primary cash values, the larger values being built up by different combinations of the said primary values, independent cash ejecting devices for the primary cash values, means for moving any selected one of the main slides, means whereby basic slides of an aggregate value equal to the value of any main slide are moved into inoperative position when the main slide is moved, normally inoperative latch means between the basic slides and the cash ejecting devices of corresponding value, and selective means for releasing certain of the latches to produce an operative connection between the cash ejecting devices and the basic slides provided the basic slides have not been moved into inoperative position, and means for moving all of the basic slides which have not been previously moved so as to actuate the corresponding cash ejecting devices.

15. A machine of the character described including a series of main slides of different numerical values and among which are a number of basic slides for the primary cash values, the larger values being built up by different combinations of the said primary values, independent cash ejecting devices for the primary cash values, means for moving any selected one of the main slides, means whereby basic slides of an aggregate value equal to the value of any main slide are moved into inoperative position when the said main slide is moved, latch means between the basic slides and the corresponding cash ejecting devices, means for normally holding all of the said latch means in inoperative position, selective means for releasing certain of the latch means to produce an operative connection between the corresponding cash ejecting devices and the basic slides provided the said basic slides have not already been moved into inoperative position, and means for moving all of the basic slides which have not been previously moved so as to operate the corresponding cash ejecting devices.

16. A machine of the character described including a series of main slides of different numerical values and among which are a number of basic slides for the primary cash values, the larger values being built up by different combinations of the said primary values, independent cash ejecting devices for the primary cash values, means for moving any selected one of the main slides, means whereby basic slides of an aggregate value equal to the value of any main slide are moved into inoperative position when the said main slide is moved, latch means for producing an operative connection between the different cash ejecting devices and the corresponding basic slides, cams for holding the said latch means normally in inoperative positions, means for moving the cams to release certain of the latch means, and means for moving all of the basic slides which have not been previously moved, thereby operating the cash ejecting devices for those basic slides which were not previously moved and for which the latch means are released.

17. A machine of the character described including a series of main slides of different numerical values and among which are a number of basic slides for the primary cash values, the larger values being built up by different combinations of the said primary values, independent cash ejecting devices for the primary cash values, means for moving any selected one of the main slides, means whereby basic slides of an aggregate value equal to the value of any main slide are moved into inoperative position when the said main slide is moved, latch means for producing an operative connection between the different cash ejecting devices and the corresponding basic slides, a series of cams of different lengths engaging the latch means to normally hold the same in inoperative position, means for operating the cams to release certain of the latch means, and means for moving all of the basic slides which were not previously moved, thereby operating the ejecting devices and those basic slides which were not previously moved and for which the latch means was released.

18. A machine of the character described including a series of main slides of different numerical values and among which are a number of basic slides for the primary cash values, the larger values being built up by different combinations of the said primary values, independent cash ejecting devices for the primary cash values, means for moving any selected one of the main slides, means whereby basic slides of an aggregate value equal to the value of any main slide is moved, normally inoperative latch means between the different cash ejecting devices and corresponding basic slides, a shaft provided with a series of cams controlling the different latch means, means for rotating the shaft and moving the cams to permit certain of the latch means to become operative, and means for moving all of the basic slides which were not previously moved so as to operate the cash ejecting devices for those slides which were not previously moved and for which the latch means was permitted to become operative.

19. A machine of the character described including a series of main slides of different numerical values and among which are a number of basic slides for the primary cash values, the larger values being built up by different combinations of the said primary values, independent cash ejecting devices for the primary cash values, means for moving any selected one of the main slides, means whereby basic slides of an aggregate value equal to the value of any main slide are moved into inoperative position when the said main slide is moved, normally inoperative latch means for producing an operative connection between the different cash ejecting devices and the corresponding basic slides, a shaft provided with cams of different lengths which control the different latches, means for rotating the shaft an amount proportionate to the amount tendered so as to operate the cams and permit selected ones of the latch means to become operative, the relation between the length of the cams and the amount of rotation of the shaft determining which of the latch means shall become operative, and means for moving all of the basic slides which were not previously moved, thereby operating the ejecting devices for all of the basic slides which were not previously moved and for which the latch means was rendered operative.

20. A machine of the character described including a series of main slides of different numerical values and among which are a number of basic slides for the primary cash values, the larger values being built up by different combinations of the said primary values, independent cash ejecting devices for the primary cash values, means for moving any selected one of the main slides, means whereby basic slides of an aggregate value equal to the value of any main slide are moved into inoperative position when the said main slide is moved, normally inoperative latch means for producing an operative connection between the basic slides a shaft provided with a series of cams of different lengths, said cams controlling the latch means, a lever for rotating the shaft, and moving the cams to control the latch means, the movement of the lever being dependent upon the amount tendered in payment for the purchase and the number of latches released depending upon the relation between the length of the cams and the amount of rotation of the shaft, and means for moving all of the basic slides which were not previously moved, thereby operating the ejecting devices for those basic slides which were not previously moved and for which the latch means was rendered operative.

21. A machine of the character described including a series of main slides of different numerical values and among which are a number of basic slides for the primary cash values, the larger values being built up by different combinations of the said primary values, independent cash ejecting devices for the primary cash values, means for moving any selected one of the main slides, means whereby basic slides of an aggregate value equal to the value of any main slide are moved into inoperative position when the said main slide is moved, latch members for producing an operative connection between the different cash ejecting devices and the corresponding basic slides, a shaft provided with cams of different lengths, said cams normally engaging the spring latch members to hold the same in inoperative positions, means for rotating the cam shaft an amount depending upon the amount tendered in payment for the purchase so as to cause the cams to release selected ones of the latches, the number of latches which are released depending upon the relation existing between the length of the cams and the amount of rotation of the shaft, and means for moving all of the basic slides which have not been previously moved, thereby operating the ejecting means for those basic slides which were not previously moved and for which the latch member was released.

22. A machine of the character described including a series of main slides of different numerical values and among which are a number of basic slides corresponding to the primary cash values, the larger values being built up by different combinations of the primary values, independent cash ejecting devices for the primary cash values, selective keyboard means for moving into inoperative position any one of the main slides which may correspond in value to the amount of the purchase, means whereby basic slides of an aggregate value equal to the value of the main slide are simultaneously moved into inoperative position, normally inoperative latch means for producing an operative connection between the different cash ejecting devices and the corresponding basic slides, selective means for successively releasing the latch means according to the amount tendered in payment for the purchase, and means for moving all of the basic slides which were not previously moved, thereby operating the ejecting devices for those basic slides which were not previously moved and rendered operative.

23. A machine of the character described including a series of main slides of different numerical values and among which are a number of basic slides corresponding to the primary cash values, the larger values being built up by different combinations of the primary values, independent cash ejecting devices for the primary cash values, a bell crank having an operative connection with each of the slides, keys adapted to operate the bell cranks to move any one of the slides having a value corresponding to the amount of the purchase, means whereby basic slides of an aggregate value equal to the value of the main slide are simultaneously moved into inoperative position, normally inoperative latch means for producing an operative connection between the different cash ejecting devices and the corresponding basic slides, means for rendering selected ones of the latch members operative according to the amount tendered, and means for moving all of the basic slides which have not been moved, thereby operating the ejecting devices for those basic slides which were not previously moved and for which the latch means have been rendered operative.

24. A machine of the character described including a series of main slides of different numerical values and among which are a number of basic slides corresponding to the primary cash values, the larger values being built up by different combinations of the primary values, independent cash ejecting devices for the primary cash values, a bell crank having an operative connection with each of the slides, keys adapted to operate the bell cranks to move any one of the slides having a value corresponding to the amount of the purchase, means whereby basic slides of an aggregate value equal to the value of the main slide are simultaneously moved into inoperative position, normally inoperative latch means for producing an operative connection between the different cash ejecting devices and the corresponding basic slides, means for rendering operative selected ones of the latch members according to the amount tendered, means for moving all of the basic slides which have not been moved, thereby operating the ejecting devices for those basic slides which were not previously moved and for which the latch means have been rendered operative, and registering means having an operative connection with the bell crank so as to be actuated thereby.

25. A machine of the character described, including a series of main slides of different numerical values and among which are a number of basic slides corresponding to the primary cash values, an independent ejection controlling slide for each of the primary cash value slides, latch means for locking the ejection controlling slides with the respective basic slides, selective means controlling the latch means, selective means for rendering certain of the main slides inoperative, a series of cams for operating the basic slides, means for shifting one of the cams, and means upon the ejection controlling slide corresponding to the basic slide of the cam for engaging the cam when in a shifted position.

26. A machine of the character described, including a series of main slides of different cash values, ejection controlling slides, latch means for locking the ejection controlling slides with the main slides, selective means for rendering certain of the main slides inoperative, cams for operating the slides, means for shifting the position of one of the cams, and means upon one of the ejection controlling slides for engagement with the cam when in a shifted position.

27. A machine of the character described, including a main slide, an independent ejection controlling slide, latch means for locking the two slides together, selective means controlling the latch means, a cam for operating the main slide, means for shifting the same, and means upon the ejection controlling slide for engagement with the cam when in a shifted position.

28. A machine of the character described, including a series of main slides of different cash values and among which are a number of basic slides corresponding to the primary cash values, an independent ejection controlling slide for each of the basic slides, latch means for locking the ejection controlling slides with the respective basic slides, a cam shaft, a series of cams upon the cam shaft for controlling the latch means, selective means adapted to be actuated according to the amount tendered and having an operative connection with the cam shaft, selective means actuated according to the amount of the purchase for rendering certain of the basic slides inoperative, operating cams for moving the basic slides, means for shifting one of the operating cams, said means being controlled automatically by the before-mentioned cam shafts, and means upon one of the ejection controlling slides for engaging the said cam when in a shifted position.

29. A machine of the character described including a series of main slides of different numerical values, and among which are a number of basic slides corresponding to the primary cash values, the larger values being built up by different combinations of the said primary values, an ejection operating slide for each of the basic slides, normally inoperative locking means between the ejection operating slides and the basic slides, cash ejecting devices having an operative connection with the ejection operating slides, means whereby basic slides of an aggregate value equal to the value of the main slide are simultaneously moved into inoperative position, a series of cams controlling the various latches, means for moving the cams to render certain of the latches operative, and means for moving all of the basic slides which were not previously moved, thereby simultaneously moving the ejection operating slides for those basic slides which were not previously moved and for which the latch was rendered operative.

30. A machine of the character described including a series of main slides of different numerical values and among which are a number of basic slides corresponding to the primary cash values, the larger values being built up by different combinations of the said primary values, an ejection operating slide for each of the basic slides, cash ejecting devices having operative connections with the respective ejection operating slides, means for moving any selected one of the main slides having a value equivalent to the amount of the purchase, means whereby basic slides of an aggregate value equal to the value of the main slide are simultaneously moved into inoperative position, normally inoperative latches for producing an operative connection between the various ejection operating slides and the corresponding basic slides, a shaft provided with a series of cams controlling these latches, means for rotating the shaft and moving the cams to render selected ones of the latches operative according to the amount tendered in payment for the purchase, and means for moving all of the basic slides which were not previously moved, thereby simultaneously moving the ejection operating slides for those basic slides which were not previously moved and for which the latch member was rendered operative.

31. A machine of the character described including a series of main slides of different numerical values and among which are a number of basic slides corresponding to the primary cash values, the larger values being built up by different combinations of the said primary values, an ejection operating slide for each of the basic slides, cash ejecting devices having operative connection with the respective ejection operating slides, means for moving any selected one of the main slides having a value equivalent to the amount of the purchase, means whereby basic slides of an aggregate value equal to the value of the main slide are simultaneously moved into inoperative position, normally inoperative latches for producing an operative connection between the various ejection operating slides and the corresponding basic slides, a shaft provided with a series of cams of different lengths for controlling the various latches, means for rotating the shaft a predetermined amount depending upon the amount tendered in payment for the purchase for the purpose of moving the cams to render certain of the latches operative, the number of latches which are rendered operative depending upon the relation existing between the lengths of the cams and the amount of rotation of the shaft, and means for moving all of the basic slides which were not previously moved, thereby simultaneously moving the ejection operating slides for those basic slides which were not previously moved and for which the latch member was rendered operative.

32. A machine of the character described including a series of main slides of different numerical values and among which are basic slides corresponding to the primary cash values, the larger values being built up by different combinations of the said primary values, an ejection operating slide for each of the said basic slides, a cash ejecting device having an operative connection with each of the ejection operating slides, means for moving any selected one of the main slides having a value corresponding to the amount of the purchase, means whereby basic slides of an aggregate value equal to the value of the main slide are simultaneously moved into inoperative position, normally inoperative latch means between each of the ejection operating slides and the corresponding basic slide, selective means actuated according to the amount tendered in payment for permitting certain of the latches to become operative, and ejecting cams for moving all of the basic slides which were not previously moved, thereby simultaneously moving the ejection operating slides for those basic slides which were not previously moved and for which the latch member was rendered operative.

33. A machine of the character described including a series of main slides of different numerical values and among which are basic slides corresponding to the primary cash values, the larger values being built up by different combinations of the said primary values, an ejection operating slide for each of the said basic slides, a cash ejecting device having an operative connection with each of the ejection operating slides, means for moving any selected one of the main slides having a value corresponding to the amount of the purchase, means whereby basic slides of an aggregate value equal to the value of the main slide are simultaneously moved into inoperative position, normally inoperative latch means between each of the ejection operating slides and the corresponding basic slides, selective means actuated according to the amount tendered in payment for permitting certain of the latches to become operative, ejecting cams for moving all of the basic slides which were not previously moved, means for shifting one of the ejecting cams, and means carried by one of the ejection operating slides for engaging the shifting cam so as to produce a direct operation of the ejection operating slide without moving the corresponding basic slide.

34. A machine of the character described including a series of main slides of different numerical values and among which are basic slides corresponding to the primary cash values, the larger values being built up by different combinations of the said primary values, an ejection operating slide for each of the said basic slides, a cash ejecting device having an operative connection with each of the ejection operating slides, means for moving any selected one of the main slides having a value corresponding to the amount of the purchase, means whereby basic slides of an aggregate value equal to the value of the main slide are simultaneously moved into inoperative position, normally inoperative latch means for producing an operative connection between the different ejection operating slides and the corresponding basic slides, means for rendering selected ones of the latches operative according to the amount tendered in payment for the purchase, ejecting cams for moving all of the basic slides which were not previously moved, means for shifting one of the ejecting cams, and means carried by one of the ejection operating slides for engagement with the cam when in a shifted position.

35. A machine of the character described including a series of main slides of different numerical values and among which are basic slides corresponding to the primary cash values, the larger values being built up by different combinations of the said primary values, an ejection operating slide for each of the said basic slides, a cash ejecting device having an operative connection with each of the ejection operating slides, means for moving any selected one of the main slides having a value corresponding to the amount of the purchase, means whereby basic slides of an aggregate value equal to the value of the main slide are simultaneously moved into inoperative position, normally inoperative latch means for producing an operative connection between the different ejection operating slides and the corresponding basic slides, means for rendering selected ones of the latches operative depending upon the amount tendered in payment, means for moving all of the basic slides which were not previously moved, and means also controlled by the latch controlling means for enabling one of the ejection operating slides to be operated independently of the corresponding basic slide.

36. A machine of the character described including a series of main slides of different numerical values and among which are basic slides corresponding to the primary cash values, the larger values being built up by different combinations of the said primary values, an ejection operating slide for each of the said basic slides, a cash ejecting device having an operative connection with each of the ejection operating slides, means for moving any selected one of the main slides having a value corresponding to the amount of the purchase, means whereby basic slides of an aggregate value equal to the value of the main slide are simultaneously moved into inoperative position, normally inoperative latch means between the ejection operating slides and the corresponding basic slides, a shaft, means controlled by the shaft for permitting certain of the latches to become operative according to the amount tendered in payment for the purchase, means for moving all of the basic slides which were not previously moved, and means controlled by the before mentioned shaft for positively moving one of the ejection operating slides independently of the corresponding basic slide.

37. A machine of the character described including a series of main slides of different numerical values and among which are basic slides corresponding to the primary cash values, the larger values being built up by different combinations of the said primary values, an ejection operating slide for each of the basic slides, a cash ejection device having an operative connection with each of the ejection operating slides, means for moving any selected one of the main slides having a value corresponding to the amount of the purchase, means whereby basic slides of an aggregate value equal to the value of the main slide are simultaneously moved into inoperative position, normally inoperative latch means between the ejection operating slides and the corresponding basic slides, a shaft, means upon the shaft for rendering certain of the latches operative according to the amount tendered in payment for the purchase, means for moving all of the basic slides which were not previously moved, a cam upon the shaft, and means controlled by the cam for enabling one of the ejection operating slides to be moved independently of the corresponding basic slide.

38. A machine of the character described including a series of main slides of different numerical values and among which are basic slides corresponding to the primary cash values, the larger values being built up by different combinations of the said primary values, an ejection operating slide for each of the basic slides, a cash ejection device having an operative connection with each of the ejection operating slides, means for moving any selected one of the main slides having a value corresponding to the amount of the purchase, means whereby basic slides of an aggregate value equal to the value of the main slide are simultaneously moved into inoperative position, normally inoperative latch means between the ejection operating slides and the corresponding basic slides, a shaft, means upon the shaft for rendering certain of the latches operative according to the amount tendered in payment for the purchase, ejecting cams for moving all of the basic slides which were not previously moved, means controlled by the before mentioned shaft for shifting one of the ejecting cams, and means upon one of the ejection operating slides for engagement with the shifted cam to produce a direct operation of the ejection operating slide.

39. A machine of the character described including a series of main slides of different numerical values and among which are basic slides corresponding to the primary cash values, the larger values being built up by different combinations of the said primary values, an ejection operating slide for each of the basic slides, a cash ejection device having an operative connection with each of the ejection operating slides, means for moving any selected one of the main slides having a value corresponding to the amount of the purchase, means whereby basic slides of an aggregate value equal to the value of the main slide are simultaneously moved into inoperative position, normally inoperative latch means between the ejection operating slides and the corresponding basic slides, a shaft provided with a series of cams of different lengths which control the various latches, means for rotating the shaft to render certain of the latches operative according to the amount tendered in payment for the purchase, a shifting cam upon the shaft, ejecting cams for moving all of the basic slides which were not previously moved, a shifting lever adapted to be actuated by the shifting cam for shifting the position of one of the ejecting cams, and means upon one of the ejection operating slides for engagement with the shifted cam for producing a direct operation of the said ejection operating slide.

40. A machine of the character described, including cents ejecting means, selective means adapted to be actuated according to the amount of the purchase for setting the cents ejecting means to discharge the difference between the cents portion of the purchase and one dollar, dollars ejecting means, a series of dollars slides of different numerical values, keys for the dollars slides, a shiftable connection between the keys and the dollars slides, means operated by the actuation of the cents selective means for shifting the connections between the keys and the slides so that each key is connected to the slide of the next higher value, and selective means adapted to be actuated according to the amount tendered and to coöperate with the cents slides and dollars slides to set the ejecting means to discharge the difference between the amount tendered and the value of the purchase.

41. A machine of the character described, including cents ejecting means, selective means adapted to be actuated according to the amount of the purchase for setting the cents ejecting means to discharge the difference between the cents portion of the purchase and one dollar, dollars ejecting means, a series of dollars slides of different numerical values, keys for the dollars slides, levers between the keys and the respective dollars slides, means actuated by the cents selective means for shifting the levers and causing each lever to engage the dollars slide of the next higher value, and selective means adapted to be actuated according to the amount tendered and to coöperate with the dollars slides to set the dollars ejecting means to discharge the proper change in dollars.

42. A machine of the character described, including cents ejecting means, selective means adapted to be actuated according to the amount of the purchase for setting the cents ejecting means to discharge the difference between the cents portion of the purchase and one dollar, dollars ejecting means, a series of dollars slides of different numerical values, keys for the dollars slides, a longitudinally shiftable shaft, a series of levers carried by the shaft and producing an operative connection between the keys and the corresponding dollars slides, means actuated by the cents selective means for shifting the shaft and causing the levers to engage dollars slides of the next higher values, and selective means adapted to be actuated according to the amount tendered and to cooperate with the dollars slide to set the dollars ejecting means to discharge the proper change in dollars.

43. A machine of the character described including cents ejecting means, selective means adapted to be actuated according to the amount of the purchase for setting the cents ejecting means to discharge the difference between the cents portion of the purchase and one dollar, dollars ejecting means, a series of dollars slides of different numerical values, a selective keyboard adapted to be actuated according to the dollars portion of the purchase and including a key for each of the dollars slides, lugs projecting from opposite sides of the dollars slides, a longitudinally shiftable shaft, a series of levers carried by the shaft, one end of each of the levers being engaged by a key while the opposite end thereof engaged a lug of the corresponding slide, means actuated by the cents selective means for shifting the shaft and causing the levers thereon to be moved into engagement with the lugs upon slides of the next higher value, and selective means adapted to be actuated according to the amount tendered and to coöperate with the dollars slides for setting the dollars ejecting means to discharge the proper change in dollars.

44. A machine of the character described including cents ejecting means, a series of cents slides of different numerical values arranged in a bank in the upper part of the machine, means for operating a cents slide of a value corresponding to the cents portion of the purchase, dollars ejecting means, a series of dollars slides of different numerical values arranged in a bank beneath said cents slides, keys for operating a dollars slide of a value corresponding to the dollars of the purchase when the purchase involved an even number of dollars or of a value of one dollar more than the dollars involved in the purchase when the purchase is for dollars and cents, and selective means adapted to be actuated according to the amount tendered and to coöperate with the cents slides and dollars slides for setting the cents ejecting means and dollars ejecting means to discharge the difference between one dollar and the value of the cents slide which was operated and the difference between the amount tendered and the value of the dollars slide which was operated.

45. A machine of the character described including cents ejecting means, a cents keyboard adapted to be operated according to the amount of the purchase, selective means adapted to be operated according to the amount tendered, means actuated by the cents keyboard and the selective means for setting the cents ejecting means to discharge the difference between the cents portion of the purchase price and the amount tendered or between the cents portion of the purchase price and one dollar when the amount tendered is more than one dollar, dollars ejecting means, a dollars keyboard adapted to be operated according to the amount of the purchase, dollars selective means adapted to be actuated according to the amount tendered, means operated by the dollars keyboard and the dollars selective means for setting the dollars ejecting means to discharge the difference between the amount of the purchase and the amount tendered where the purchase involves an even number of dollars, and means actuated by the initial operation of the cents selective means for subsequently reducing by one dollar the amount of change to be ejected by the dollars mechanism.

46. A machine of the character described including cents ejecting means, a cents keyboard adapted to be operated according to the amount of the purchase, cents selective means adapted to be operated according to the amount tendered up to one dollar, means operated by the cents keyboard and cents selective means for setting the cents ejecting means to discharge the difference between the amount of the purchase and the amount tendered when one dollar or less is involved, and the difference between the cents portion of the purchase price and one dollar when more than one dollar is tendered, dollars ejecting means, a dollars keyboard adapted to be actuated according to the dollars of the purchase, dollars selective means adapted to be actuated according to the amount tendered, means operated by the dollars selective means and dollars keyboard for setting the dollars ejecting means to discharge the difference between the amount tendered and the value of the key which was operated, and means actuated by the initial operation of the cents selective means for automatically increasing by one dollar the effective value of the dollars key which is operated so as to reduce by one dollar the amount of change which would otherwise be ejected by the dollars mechanism.

47. A machine of the character described including a cents ejecting means, a cents keyboard adapted to be operated according to the amount of the purchase, cents slides of numerical values corresponding to the keys and adapted to be operated by the corresponding keys, said slides being arranged in the same plane in the upper part of the machine, means adapted to be operated according to the amount tendered up to one dollar for coöperation with the slides to set the cents ejecting means to discharge the difference between the value of the cents slide which was operated and the amount tendered or the difference between the value of the cents slide and one dollar, when more than one dollar is tendered, dollars ejecting means, dollars slides of numerical values corresponding to the keys and adapted to be actuated by corresponding keys and arranged in a bank beneath the series of cents keys, means adapted to be actuated according to the amount tendered and coöperating with the dollars slides to set the dollars ejecting means to discharge the difference between the amount tendered and the value of the dollars slide which was operated, and means whereby each dollar key will operate a dollars slide of the next higher value when the cents keyboard is operated before the dollars keyboard.

48. A machine of the character described including cents ejecting means, a cents keyboard, cents slides of numerical values corresponding to the cents keys and adapted to be actuated by corresponding keys, said slides being arranged in a bank in the upper part of the machine, cents selective means adapted to be actuated according to the amount tendered up to one dollar for coöperation with the slides to set the cents ejecting means to discharge the difference between the cents portion of the purchase price and the amount tendered when one dollar or less is involved, and the difference between the cents portion of the purchase price and one dollar when more than one dollar is tendered, dollars ejecting means, a dollars keyboard, dollars slides of numerical values corresponding to the dollars keys, said dollars slides being arranged in a bank beneath the cents bank and adapted to be operated by corresponding keys, dollars selective means adapted to be actuated according to the amount tendered and coöperating with the dollars slides to set the dollars ejecting means to discharge the difference between the amount tendered and the value of the dollars slide which was operated, and means for automatically operating the one dollar slide when the dollars selective means is operated without operating the dollars keyboard.

49. A machine of the character described including cents ejecting means, a cents keyboard, cents slides of numerical values corresponding to the cents keys and adapted to be actuated by corresponding keys, said slides being arranged in a bank in the upper part of the machine, cents selective means adapted to be actuated according to the amount tendered up to one dollar and constructed for coöperation with the slides to set the cents ejecting means to discharge the difference between the cents portion of the purchase price and the amount tendered when one dollar or less is involved, and the difference between the cents portion of the purchase price and one dollar when more than one dollar is tendered, dollars ejecting means, a dollars keyboard, dollars slides of numerical values corresponding to the dollars keys, said dollars slides being arranged in a bank beneath said cents bank and adapted to be operated by corresponding keys, dollars selective means adapted to be actuated according to the amount tendered and coöperating with the dollars slides to set the dollars ejecting means to discharge the difference between the amount tendered and the value of the dollars slide which was operated, means whereby each dollars key will operate a dollars slide of the next higher value when the cents keyboard is operated before the dollars keyboard, and means for automatically operating the one dollar slide when the dollars selective means is operated without operating the dollars keyboard.

50. A machine of the character described including cents ejecting means, a cents keyboard adapted to be operated according to the cents portion of the purchase, cents slides of numerical values corresponding to the keys and adapted to be operated by the corresponding keys, dollars ejecting means, a dollars keyboard adapted to be operated according to the dollars involved in the purchase, dollars slides of values corresponding to the keys, an operative connection between each dollars slide and the corresponding dollars key, means operated by the cents keyboard for automatically breaking the operative connection between the dollars keys and the corresponding dollars slides and producing an operative connection between each dollars key and the dollars slide of the next higher value, and means adapted to be actuated according to the amount tendered and constructed for coöperation with the cents slides and dollars slides to set the cents ejecting means to discharge the difference between the value of the cents slide which was operated and the amount tendered or the difference between the value of the said cents slide and one dollar when more than one dollar is tendered and the dollars ejecting means to discharge the difference between the amount tendered and the dollars slide which was operated.

51. A machine of the character described including cents ejecting means, a cents keyboard adapted to be operated according to the cents portion of the purchase, cents slides of numerical values corresponding to the cents keys and adapted to be operated by corresponding keys, a dollars keyboard adapted to be actuated according to the dollars of the purchase, dollars slides having values corresponding to the values of the keys, a shiftable connection between each dollars key and the dollars slides of the same value and the next higher value, the said shiftable connection normally producing an operative connection between the dollars key and the dollars slide of the same value, means operated by the cents keyboard for automatically shifting the said connections to produce operative connections between each dollars key and the dollars slide of the next higher value, and selective means adapted to be operated according to the amount tendered and constructed for coöperation with the cents slides and dollars slides to set the cents ejecting means to discharge the difference between the cents portion of the purchase price and the amount tendered where less than one dollar is involved and the difference between the cents portion of the purchase price and one dollar when more than one dollar is involved, and also to set the dollars ejecting means to discharge the difference between the amount tendered and the value of the dollars slide which was operated.

52. A machine of the character described including cents ejecting means, a cents keyboard adapted to be operated according to the cents portion of the purchase, cents slides of numerical values corresponding to the cents keys and adapted to be operated by corresponding keys, a dollars keyboard adapted to be actuated according to the dollars of the purchase, dollars slides having values corresponding to the values of the keys, levers producing operative connections between the dollars keys and the corresponding dollars slides, means operated by the cents keyboard for automatically shifting all of the levers so as to produce an operative connection between each dollars key and the dollars slide of the next higher value, and selective means adapted to be actuated according to the amount tendered and constructed for coöperation with the cents slides and dollars slides to set the cents ejecting means to discharge the difference between the value of the cents slide which was operated and the amount tendered when less than one dollar or the difference between the value of the cents slide and one dollar when more than one dollar was tendered, and also to set the dollars ejecting means to discharge the difference between the amount tendered and the value of the dollars slide which was operated.

53. A machine of the character described including cents ejecting means, a cents keyboard adapted to be operated according to the cents portion of the purchase, cents slides of numerical values corresponding to the cents keys and adapted to be operated by corresponding keys, a dollars keyboard adapted to be actuated according to the dollars of the purchase, dollars slides having values corresponding to the values of the keys, a longitudinally movable shaft, a series of levers mounted to rotate upon the shaft and to be moved bodily therewith upon longitudinal movement of the shaft, said levers normally producing operative connections between the dollars keys and the corresponding dollars slides, means operated by the cents keyboard for automatically moving the shaft longitudinally and shifting the levers so as to produce operative connections between each dollars key and the dollars slide of the next higher value, and selective means adapted to be operated according to the amount tendered and constructed for coöperation with the cents slides and dollars slides to set the cents ejecting means to discharge the difference between the value of the cents slide which was operated and the amount tendered when less than one dollar or the difference between the value of the cents slide and one dollar when more than one dollar was tendered, and also to set the dollars ejecting means to discharge the difference between the amount tendered and the value of the dollars slide which was operated.

54. A machine of the character described including cents ejecting means, a cents keyboard adapted to be operated according to the cents portion of the purchase, cents slides of numerical values corresponding to the cents keys and adapted to be operated by corresponding keys, a dollars keyboard adapted to be actuated according to the dollars of the purchase, dollars slides having values corresponding to the values of the keys, a longitudinally movable shaft, a series of levers loose upon the shaft and movable therewith when the shaft is shifted longitudinally, said levers normally producing an operative connection between the dollars keys and the corresponding dollars slides, a shifting lever having an operative connection with the shaft, and means operated by the cents keyboard for automatically controlling the shifting lever to move the shaft longitudinally and shift the levers thereon so as to automatically connect each dollars key with the dollars slide of the next higher value upon operation of the cents keyboard, and selective means adapted to be operated according to the amount tendered and constructed for coöperation with the cents slides and dollars slides to set the cents ejecting means to discharge the difference between the value of the cents slide which was operated and the amount tendered when less than one dollar or the difference between the value of the cents slide and one dollar when more than one dollar was tendered, and also to set the dollars ejecting means to discharge the difference between the amount tendered and the value of the dollars slide which was operated.

55. A machine of the character described including cents ejecting means, a cents keyboard adapted to be actuated according to the cents portion of the purchase, cents slides of numerical values corresponding to the cents keys and adapted to be actuated by the said corresponding keys, a dollars keyboard adapted to be actuated according to the dollars of the purchase price, dollars slides of numerical values corresponding to the value of the keys, a longitudinally movable shaft, bell cranks loose upon the shaft and movable bodily therewith when the shaft is shifted longitudinally, said bell cranks normally producing operative connections between the various dollars keys and the corresponding dollars slides, a shifting lever for moving the shaft, a swinging rod extending across the cents keys so as to be actuated when any one of the cents keys is operated, an operative connection between the swinging rod and the shifter lever for moving the shaft longitudinally and shifting the position of the bell cranks whereby they produce operative connections between the various dollars keys and the dollars slides of next higher value, and selective means adapted to be actuated according to the amount of the purchase and constructed for coöperation with the cents slides and dollars slides for setting the cents ejecting means to discharge the difference between the amount of the purchase and the amount tendered when one dollar or less is involved and the difference between the amount purchased and one dollar when more than one dollar is tendered, and also for setting the dollars ejecting means to discharge the difference between the amount tendered and the value of the dollars slide which was operated.

56. A machine of the character described including cents ejecting means, a cents keyboard, a series of cents slides of numerical values corresponding to the keys and adapted to be actuated by the corresponding keys, dollars ejecting means, dollars keys adapted to be actuated according to the amount of the purchase, dollars slides of numerical values corresponding to the keys and adapted to be operated by the keys, selective means adapted to be actuated according to the amount tendered and constructed for coöperation with the cents slides and dollars slides to set the cents ejecting means to discharge the difference between the amount purchased and the amount tendered when less than one dollar is involved and the difference between the cents portion of the purchase price and one dollar when more than one dollar is involved, and also to set the dollars ejecting means to discharge the difference between the amount tendered and the value of the dollars slide which was actuated, and means operated by the said selective means for automatically operating the one dollar slide when the cents keyboard is operated and the dollars keyboard is not operated.

57. A machine of the character described including cents ejecting means, a series of cents slides of different numerical values arranged in a bank in the upper part of the machine, means for operating a cents slide of a value corresponding to the cents portion of the purchase, dollars ejecting means, a series of dollars slides of different numerical values also arranged in a bank beneath said cents bank, means for operating a dollars slide of a value corresponding to the dollars of the purchase where the purchase involves an even number of dollars or a value of one dollar more than the dollars of the purchase where the purchase involves both dollars and cents, independent means for operating the one dollar slide, means for rendering the said means inoperative when one of the dollars slides is operated in the regular manner, and selective means adapted to be actuated according to the amount tendered and constructed for coöperation with the cents slides and dollars slides to set the cents ejecting means to discharge the difference between the amount tendered and the value of the cents slide which was operated when one dollar or less is involved and the difference between one dollar and the value of the said slide when more than one dollar is purchased, and also to set the dollars ejecting means to discharge the difference between the amount tendered and the value of the dollars slide which was operated.

58. A machine of the character described including cents ejecting means, a series of cents slides of different numerical values, means for operating a cents slide of a value corresponding to the cents portion of the purchase, dollars ejecting means, a series of dollars slides of different numerical values, means for operating a dollars slide of a value corresponding to the dollars of the purchase price when the purchase involves an even number of dollars or of a value of one dollar more than the dollars of the purchase when the purchase is for dollars and cents, selective means adapted to be actuated according to the amount tendered and constructed for coöperation with the cents slides and dollars slides to set the cents ejecting means to discharge the difference between the amount tendered and the value of the cents slide which was operated where one dollar or less is involved and the difference between the value of the said cents slide and one dollar where more than one dollar is tendered, and also to set the dollars ejecting means to discharge the difference between the amount tendered and the value of the dollars slide which was operated, independent means for operating the one dollar slide, a plunger having an operative connection with said means, means for breaking this operative connection when one of the dollars slides is operated, and means for operating the plunger when the selective means is actuated.

59. A machine of the character described including cents ejecting means, a series of cents slides of different numerical values, means for operating a cents slide of a value corresponding to the cents portion of the purchase, dollars ejecting means, a series of dollars slides of different numerical values, means for operating a dollars slide of a value corresponding to the dollars of the purchase price when the purchase involves an even number of dollars or of a value of one dollar more than the dollars of the purchase when the purchase is for dollars and cents, selective means adapted to be actuated according to the amount tendered and constructed for coöperation with the cents slides and dollars slides to set the cents ejecting means to discharge the difference between the amount tendered and the value of the cents slide which was operated where one dollar or less is involved and the difference between the value of the said cents slide and one dollar where more than one dollar is tendered, and also to set the dollars ejecting means to discharge the difference between the amount tendered and the value of the dollars slide which was operated, independent means for operating the one dollar slide, a spring actuated plunger, an operative connection between the spring actuated plunger and the independent means for operating the one dollar slide, means for breaking this operative connection when one of the dollars slides is operated in the usual manner, means for setting the spring actuated plunger when one of the cents slides is operated, and means for releasing the spring actuated plunger when the selective means is operated.

60. A machine of the character described including cash ejecting means, a series of slides of different values adapted to be actuated according to the amount of the purchase, a lever adapted to be actuated according to the amount tendered, means controlled by the lever and constructed for coöperation with the slides to set the cash ejecting means to discharge the difference between the amount tendered and the value of the slide which was operated, a resetting frame for the slides, resetting means for the lever, a main operating member having an operative connection with the resetting means for the lever and the resetting frame for the slides, and means controlled by the said main operating member for actuating the cash ejecting means.

61. A machine of the character described including cash ejecting means, a series of slides of different values adapted to be actuated according to the amount of the purchase, a lever adapted to be actuated according to the amount tendered, means controlled by the lever and constructed for coöperation with the slides to set the cash ejecting means to discharge the difference between the amount tendered and the value of the slide which was operated, resetting means for the slides, resetting means for the lever, yielding means holding the said resetting means normally in inoperative positions, a shaft, and means operated by the shaft for moving the resetting means into operative positions and then releasing the same.

62. A machine of the character described including a series of main slides of different numerical values, and among which are a number of basic slides corresponding to the primary cash values, means for moving any selected one of the main slides, means whereby basic slides of an aggregate value equal to the value of any main slide are moved into inoperative position when the main slide is moved, an ejection operating slide for each of the basic slides, independent cash ejecting devices having operative connections with the ejection operating slides, latch connections between the ejection operating slides and the basic slides, selective means adapted to be actuated according to the amount tendered and constructed for coöperation with the main slides and latch devices to set the cash ejecting means to discharge the difference between the amount tendered and the value of the main slide which was operated, a resetting frame for the main slides, and means actuated by the said resetting frame for resetting the ejection operating slides.

63. A machine of the character described including a series of main slides of different numerical values, and among which are a number of basic slides corresponding to the primary cash values, means for moving any selected one of the main slides, means whereby basic slides of an aggregate value equal to the value of any main slide are moved into inoperative position when the main slide is moved, an ejection operating slide for each of the basic slides, independent cash ejecting devices having operative connections with the ejection operating slides, latch connections between the ejection operating slides and the basic slides, selective means adapted to be actuated according to the amount tendered and constructed for coöperation with the main slides and latch devices to set the cash ejecting means to discharge the difference between the amount tendered and the value of the main slide which was operated, a resetting frame for the main slides, a shaft, resetting fingers upon the shaft for the ejection operating slides, an operative connection between the shaft and the resetting frame, yielding means normally holding the resetting frame in an inoperative position, and means for operating the resetting frame.

In testimony whereof I hereunto affix my signature in the presence of two witnesses.

CHARLES D. RICHARD.

Witnesses:
EMORY L. GROFF,
ELSIE C. SMALL.